United States Patent [19]

Ogawa et al.

[11] Patent Number: 5,555,500
[45] Date of Patent: Sep. 10, 1996

[54] OIL TEMPERATURE ESTIMATING DEVICE FOR SHOCK ABSORBER, AND SHOCK ABSORBER DAMPING FORCE CONTROL APPARATUS USING SUCH OIL TEMPERATURE ESTIMATING DEVICE

[75] Inventors: Kazuo Ogawa, Toyota; Hideo Inoue, Kanagawa-ken, both of Japan

[73] Assignee: Toyota Jidosha Kabushiki Kaisha, Toyota, Japan

[21] Appl. No.: 329,741

[22] Filed: Oct. 26, 1994

[30] Foreign Application Priority Data

Oct. 28, 1993 [JP] Japan ..................................... 5-270830

[51] Int. Cl.$^6$ .................................................. B60G 17/08
[52] U.S. Cl. ............... 364/424.05; 364/557; 364/571.03; 374/117; 374/154
[58] Field of Search ........................ 364/424.05, 424.01, 364/557, 566, 571.03, 577; 180/277, 378, 276, 381, 309; 73/54.43, 54.42; 374/117, 118, 119, 134, 154

[56] References Cited

U.S. PATENT DOCUMENTS

| | | | |
|---|---|---|---|
| 3,791,494 | 2/1974 | McNally | 180/277 |
| 4,805,101 | 2/1989 | Dietrich et al. | 364/424.01 |
| 4,856,798 | 8/1989 | Buma et al. | 280/707 |
| 5,159,554 | 10/1992 | Buma et al. | 364/424.05 |
| 5,162,996 | 11/1992 | Matsumoto et al. | 364/424.05 |
| 5,200,895 | 4/1993 | Emura et al. | 364/424.05 |
| 5,267,558 | 12/1993 | Yoshioka et al. | 364/424.05 |
| 5,322,320 | 6/1994 | Sahashi et al. | 280/707 |
| 5,384,705 | 1/1995 | Inagaki et al. | 364/424.05 |

FOREIGN PATENT DOCUMENTS

| | | |
|---|---|---|
| 0220115 | 4/1987 | European Pat. Off. . |
| 0220985 | 5/1987 | European Pat. Off. . |
| 0265670 | 5/1988 | European Pat. Off. . |
| 4039839 | 6/1991 | European Pat. Off. . |
| 0440943 | 8/1991 | European Pat. Off. . |
| 59-075815 | 4/1984 | Japan . |
| 60-263735 | 12/1985 | Japan . |
| 63-3536U | 1/1988 | Japan . |

*Primary Examiner*—Kevin J. Teska
*Assistant Examiner*—Tan Nguyen
*Attorney, Agent, or Firm*—Kenyon & Kenyon

[57] ABSTRACT

A device for estimating a temperature of a working oil in a shock absorber in a suspension system which connects a sprung member and an unsprung member of a motor vehicle, wherein the temperature of the oil is estimated on the basis of at least detected vertical acceleration of the sprung member. The device may be suitably incorporated in an apparatus for controlling the damping characteristic of the shock absorber, wherein an actuator is operated by a controller for changing the damping characteristic, and the controller includes the temperature estimating device, and a device for inhibiting an operation of the actuator to control the damping characteristic when the oil temperature estimated by the temperature estimating device is lower than a predetermined threshold.

15 Claims, 27 Drawing Sheets

ROAD SURFACE

FIG. 31
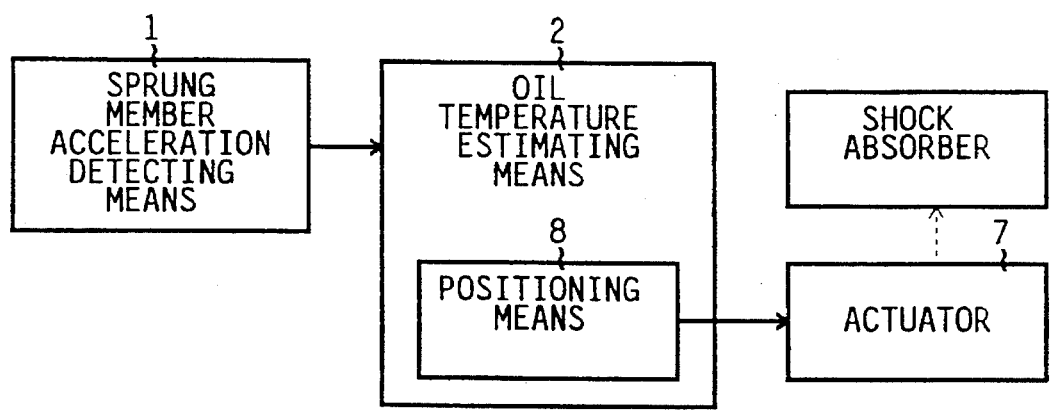
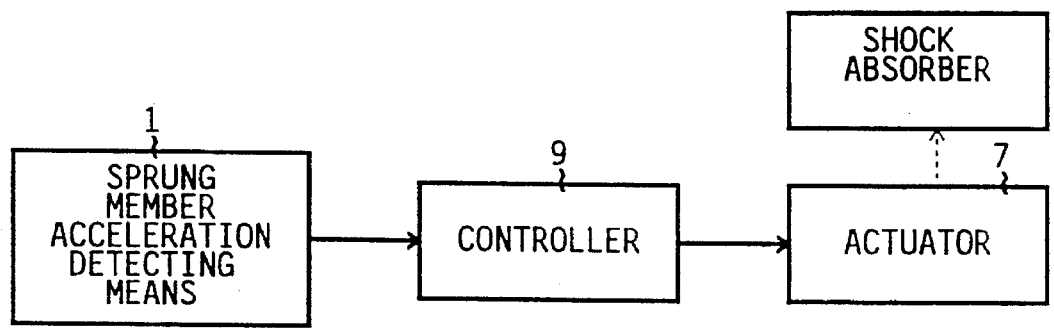
FIG. 32

OIL TEMPERATURE ESTIMATING DEVICE FOR SHOCK ABSORBER, AND SHOCK ABSORBER DAMPING FORCE CONTROL APPARATUS USING SUCH OIL TEMPERATURE ESTIMATING DEVICE

BACKGROUND OF THE INVENTION

1. Field of the Invention

The present invention relates to a device for estimating the temperature of a working oil in a shock absorber, and an apparatus for controlling the damping force of the shock absorber, which apparatus incorporates such oil temperature estimating device. More particularly, this invention is concerned with a technique for estimating the oil temperature in the shock absorber, without using a temperature sensor.

2. Discussion of the Prior Art

The temperature of a working oil or fluid in a shock absorber used in a suspension system of a motor vehicle, for example, varies with the ambient temperature and the running condition or hysteresis of the vehicle, and the viscosity of the oil increases with a decrease in the oil temperature. To avoid various drawbacks caused by a change in the viscosity of the oil due to a change in the oil temperature, there has been a need to know the temperature of the oil in the shock absorber. An example of a technique to meet this need is disclosed in laid-open Publication No. 63-3536 of unexamined Japanese Utility Model Application, in which a temperature sensor is used to detect the oil temperature within a shock absorber.

On the other hand, it is desired to obtain the oil temperature within the shock absorber without using a temperature sensor.

There is also the following need in connection with a shock absorber.

In a vehicle suspension system wherein the damping characteristic of each shock absorber can be controlled by means of an actuator, the following drawback would arise when the oil temperature in the shock absorber is relatively low, if the damping characteristic of the shock absorber is controlled irrespective of the oil temperature in the shock absorber. For example, the actuator may not operate as intended due to an increased resistance to a sliding movement of a movable member in the shock absorber when the viscosity of the oil is relatively high. In this case, the damping characteristic of the shock absorber cannot be normally controlled. Even if the actuator can be operated as intended, the damping force of the shock absorber may be excessively large due to the oil viscosity higher than required, leading to abnormal control of the damping force of the shock absorber. Where a stepping motor is used as the actuator for controlling the damping characteristic of the shock absorber, the motor may suffer from loss of synchronism due to an insufficient drive torque of the motor in relation to the sliding resistance of the shock absorber when the motor is energized while the oil temperature in the shock absorber is relatively low, for example, within a range of about −20° C. and about −10° C. Thus, it is desirable to detect the oil temperature of the shock absorber, for preventing abnormal control of the damping force of the shock absorber when the oil temperature is lower than the optimum level.

SUMMARY OF THE INVENTION

It is therefore a first object of this invention to provide a device for estimating the oil temperature in a shock absorber, without using a temperature sensor.

It is a second object of the invention to provide a damping force control apparatus for a shock absorber, which is substantially free from abnormal control of the damping force due to a low temperature of the oil in the shock absorber.

The first object indicated above may be achieved according to a first aspect of the present invention, which provides a device for estimating a temperature of a working oil in a shock absorber in a suspension system which connects a sprung member and an unsprung member of a motor vehicle, the device comprising, as illustrated in FIG. 26: (a) acceleration detecting means 1 for detecting an actual value of vertical acceleration of the sprung member; and (b) temperature estimating means 2 for estimating the temperature of the working oil in the shock absorber on the basis of at least the actual value of vertical acceleration of the sprung member detected by the acceleration detecting means 1.

The term "shock absorber" used in the present application is interpreted to encompass any device capable of functioning to damp or absorb a vibrational load received by the body of a motor vehicle, by utilizing a flow resistance of a working oil or fluid in the device. The "shock absorber" is not limited to a device generally called "shock absorber" whose damping characteristic is fixed or non-controllable as in a so-called passive type suspension system, or is variable or controllable by an actuator as in a so-called semi-active type suspension system. Further, the term "shock absorber" is interpreted to include a hydraulic cylinder used in a so-called fully-active type suspension system wherein the hydraulic cylinder connecting the sprung and unsprung members of the vehicle is positively controlled.

In the temperature estimating device constructed according to the first aspect of the invention as described above, the temperature of the oil in the shock absorber is estimated on the basis of at least the detected actual vertical acceleration value of the sprung member. In a shock absorber in general, there exists a given relationship among the oil temperature, damping force, and relative speed of the sprung and unsprung members. Further, an equation of motion is satisfied in a system of motion which consists of a sprung member, an unsprung member, and a suspension system which includes a shock absorber and a spring and which connects the sprung and unsprung members. That is, there is also a given relationship between the acceleration of the sprung member, damping force of the shock absorber, and relative displacement of the sprung and unsprung members. The relative speed of the sprung and unsprung members is a time derivative of the relative displacement of these members. Accordingly, there is a certain relationship between the acceleration of the sprung member and the oil temperature in the shock absorber, whereby the oil temperature can be estimated based on the acceleration of the sprung member. It will thus be understood that the oil temperature can be estimated based on at least the actually detected acceleration value of the sprung member, according to the principle of the present invention utilizing the relationships indicated above.

The oil temperature estimating device of the present invention constructed as described above may be used for (1) a damping force control apparatus in which the control of the damping force of the shock absorber is inhibited when the oil temperature in the shock absorber is lower than a predetermined threshold, (2) a damping force control apparatus in which the effective cross sectional area of flow of the oil through an oil passage in the shock absorber is adjusted depending upon the oil temperature so as to prevent a variation in the damping characteristic of the shock absorber, and (3) a damping force control apparatus in which the operating amount of an actuator to control the damping force of the shock absorber is determined on the basis of input signals such as those indicative of the actual acceleration of the sprung member, and speed and steering angle of the vehicle, as well as a signal indicative of the oil temperature in the shock absorber. The present oil temperature estimating device may be used for purposes other than avoiding the drawbacks of the shock absorber due to a high degree of viscosity of the oil when the oil temperature is lower than the optimum level.

The oil temperature estimating device according to this invention may be adapted to either estimate the value of the oil temperature continuously, or estimate the oil temperature in steps such that the estimated temperature falls in one of two or more ranges, for example, in one of low and high ranges, or very low, low and high ranges.

In the case where the oil temperature estimating device is adapted to estimate the oil temperature in two steps, the determination as to whether the oil temperature is in the low range or high range is effected according to a first rule using the actual vertical acceleration value of the sprung member detected by the acceleration detecting means. In this case, the oil temperature estimating device may be operated even after the oil temperature has been once determined to be in the low range. To this end, either the first rule indicated above or a second rule different from the first rule may be used to determine whether the oil temperature which has been once determined to be in the low range is raised into the high range. For example, the second rule may be formulated to determine whether a condition that should have raised the oil temperature into the high range has been established, to determine whether the oil temperature is in the high range.

Similarly, the oil temperature estimating device may be operated even after the oil temperature has been once determined to be in the high range. To this end, either the first rule or the second rule may be used to determine whether the oil temperature which has been once determined to be in the high range is lowered into the low range. For instance, the second rule used in this case may be formulated to determine whether a condition that should have lowered the oil temperature into the low range has been established, to determine whether the oil temperature is in the low range.

In the case where the oil temperature estimating device is adapted to estimate the oil temperature in three steps, the determination as to whether the oil temperature is in the very low range, low range or high range is effected according to a first rule using the actual vertical acceleration value of the sprung member. In this case, the oil temperature estimating device may be operated according to the first rule even after the oil temperature has been once determined to be in the very low range, or turned off when the oil temperature has been determined to be in the high range. The device may be operated according to a second rule different from the first rule, even after the oil temperature which has been once determined to be in the low range. In this case, the second rule may be formulated to determine whether a condition that should have raised the oil temperature into the high range has been established, to determine whether the oil temperature is in the high range.

It will be understood that the present temperature estimating device according to the first aspect of the invention is capable of estimating the temperature of the oil in the shock absorber, without using a temperature sensor. Where the present temperature estimating device is used in a damping force control apparatus for a shock absorber in which acceleration detecting means for detecting the acceleration of the sprung member is used for controlling the damping force, this acceleration detecting means can be utilized by the temperature estimating device to estimate the oil temperature of the shock absorber. Thus, the temperature estimating device does not require any sensor for measuring the oil temperature, whereby the temperature estimating device is available at a comparatively reduced cost and can be installed in a relatively narrow space.

According to a first preferred form of the present invention, the oil temperature estimating device further comprises displacement detecting means 3 for detecting a relative displacement of the sprung and unsprung members in a vertical direction of the motor vehicle, as illustrated in FIG. 27, and the temperature estimating means 2 is of a relative estimation type comprising: (1) means for storing a predetermined relationship between a damping force of the shock absorber and a relative speed of the sprung and unsprung members when the oil temperature is at a reference level, the relative speed being a rate of change of the relative displacement; (2) means for detecting the relative speed on the basis of the relative displacement detected by the displacement detecting means; (3) means for determining a reference damping force on the basis of the detected relative speed and according to the predetermined relationship, the reference damping force being the damping force of the shock absorber which corresponds to the detected relative speed; (4) means for determining a reference value of vertical acceleration of the sprung member which is expected to occur under the determined reference damping force and the detected relative displacement; and (5) means for estimating the oil temperature on the basis of the detected actual value and the determined reference value of vertical acceleration of the sprung member.

In this first form of the invention, the oil temperature is estimated on the basis of the detected actual acceleration of the sprung member in relation to the determined reference value. Described in detail, the relative speed of the sprung and unsprung members is first detected. Then, the reference damping force of the shock absorber which is expected to be generated under the detected relative speed is determined according to a predetermined relationship between the damping force and the relative speed when the oil temperature of the shock absorber is at the reference level. The reference value of acceleration of the sprung member which corresponds to the reference damping force is determined according to the known equation of motion associated with the suspension system. The oil temperature is then estimated on the basis of the detected actual acceleration value of the sprung member in relation to the reference acceleration value. For instance, if the detected actual acceleration is relatively larger than the reference value, the shock absorber generates a damping force larger than the reference value, and this means that the viscosity of the oil in the shock absorber is higher than a suitable or optimum level. In this case, the oil temperature is estimated to be lower than the reference level.

Some advantageous arrangements according to the above first preferred form of the invention will be described by way of examples.

In one advantageous arrangement, the detected actual value of vertical acceleration of the sprung member is compared with the determined reference value at a predetermined interval, and the oil temperature is estimated on the basis of a single value obtained by the comparison of the actual and reference values. Preferably, the absolute values of these actual and reference values are obtained, and these absolute values are then smoothed (by low-pass filtering, for instance), so that the oil temperature is estimated from the smoothed values, more specifically, on the basis of a relationship between these smoothed values.

In another advantageous arrangement, a tendency of change of the detected actual value of vertical acceleration of the sprung member is compared with a tendency of change of the reference value at a predetermined interval, and the oil temperature is estimated on the basis of a relationship of these two tendency of change.

In one example of the above arrangement using the tendency of change of the actual and reference values, the absolute values of these actual and reference values obtained at the predetermined interval are smoothed, and the oil temperature is estimated on the basis of the number of the detected actual values which exceed the corresponding reference values during a predetermined sampling period. In another example, averages of the smoothed actual and reference values during the sampling period are obtained, and the oil temperature is estimated on the basis of a relationship of the obtained averages.

In the above first preferred form of the invention, the reference level of the oil temperature is determined by taking account of the specific use or application of the oil temperature estimated by the present device. For example, where the oil temperature estimating device is used for an apparatus for controlling a damping force of the shock absorber so that the estimated oil temperature is used to avoid a drawback of the actuator due to an excessively high viscosity of the oil, the reference level of the oil temperature may be an optimum or ideal level at which the viscosity of the oil is not so high as to disturb a normal operation of the actuator. In this instance, the temperature estimating means may be adapted to estimate that the oil temperature is in the low range if the detected actual value of vertical acceleration of the sprung member is larger than the reference value, and estimate that the oil temperature is in the high range if the detected actual value is not larger than the reference value. Alternatively, the temperature estimating means may be adapted to estimate that the oil temperature is in the very low range if the actual acceleration value is larger than the reference value by a difference larger than a first threshold value, estimate the oil temperature is in the low range if the difference is between the first threshold value and a second threshold value smaller than the first threshold value, and estimate the oil temperature is in the high range if the difference is smaller than the second threshold value.

According to a second preferred form of the present invention, the oil temperature estimating device further comprises displacement detecting means 3 for detecting a relative displacement of the sprung and unsprung members in a vertical direction of the motor vehicle, as illustrated in FIG. 28, and the temperature estimating means 2 is of an absolute estimation type comprising: (1) means for detecting a relative speed of the sprung and unsprung members on the basis of the relative displacement detected by the displacement detecting means; (2) means for estimating an actual value of a damping force of the shock absorber, on the basis of the detected relative displacement and the detected actual value of vertical acceleration of the sprung member; (3) means for storing a predetermined relationship among the relative speed of the sprung and unsprung members and the damping force and the oil temperature of the shock absorber; and (4) means for estimating the oil temperature on the basis of the detected relative speed and the estimated actual value of the damping force and according to the predetermined relationship.

In the above form of the invention, the actual damping force of the shock absorber is determined on the basis of the detected relative displacement of the sprung and unsprung members and the detected acceleration of the sprung member, and according to the known equation of motion associated with the suspension system. The oil temperature is estimated on the basis of the detected damping force and the relative speed of the sprung and unsprung members, and according to the predetermined relationship among the oil temperature and damping force of the shock absorber and the relative speed of the sprung and unsprung members.

According to a third preferred form of this invention, the temperature estimating device comprises vibration frequency monitoring means 4, as illustrated in FIG. 29, for determining whether a frequency of vibration of the motor vehicle during running thereof is in a predetermined one of a low range lower than a predetermined threshold and a high range higher than the predetermined threshold, and wherein the temperature estimating means 2 is of a simplified estimation type which operates while the vibration frequency monitoring means determines that the frequency of vibration is in the predetermined one of the low range and the high range, to estimate the temperature of the oil on the basis of a relationship between the actual value of vertical acceleration of the sprung member detected by the acceleration detecting means, and a reference value of vertical acceleration of the sprung member which is expected to occur when the temperature of the oil is at a predetermined reference level while the frequency of vibration of the vehicle is in the predetermined one of the low and high ranges.

In the above third preferred form of this invention, the oil temperature of the shock absorber is estimated while the vehicle vibration frequency is in the predetermined one of the low and high ranges. This estimation is effected on the basis of the relationship between the actual acceleration value of the sprung member detected while the vibration frequency of the vehicle is in the predetermined low or high range, and the reference acceleration value of the sprung member which is expected to occur when the oil temperature is at the predetermined reference level and when the vehicle vibration frequency is in the predetermined low or high range. In this respect, it is noted that while the vehicle vibration frequency is in the predetermined low or high range, there exists a predetermined relationship between the acceleration of the sprung member and the oil temperature of the shock absorber. By utilizing this relationship, the oil temperature can be easily or simply estimated without using or detecting the relative displacement and relative speed of the sprung and unsprung members.

In one advantageous arrangement of the above third preferred form of the invention, the temperature estimating means is adapted to determine that the oil temperature of the shock absorber is in a low range if the actual acceleration value of the sprung member detected while the vibration frequency of the vehicle is in the predetermined one of the low and high ranges is larger than a maximum value of the vertical acceleration of the sprung member which is expected to occur while the vehicle vibration frequency is in the predetermined low or high range and while the oil temperature is at the predetermined reference level.

The vibration frequency monitoring means may be adapted to determine whether the vehicle vibration frequency is in the high range, which may be selected in the neighborhood of 2 Hz. Preferably, the vibration frequency monitoring means obtains a high-frequency component of the actual value of vertical acceleration of the sprung member detected at a predetermined interval, by suitably processing (e.g., high-pass filtering) the detected actual acceleration value so that the high-frequency component is higher than the predetermined threshold. An absolute value of the high-frequency component is obtained, and the absolute value is then smoothed (by low-pass filtering, for example). The vibration frequency monitoring means determines that the vehicle vibration frequency is in the high range, if the smoothed value of the high-frequency component or signal is larger than a predetermined threshold.

According to a fourth preferred form of the present invention, the temperature estimating device further comprises vibration frequency determining means 5, as illustrated in FIG. 30, for determining whether a frequency of vibration of the motor vehicle during running thereof is in a low range lower than a predetermined threshold, and wherein the temperature estimating means 2 comprises estimation permitting means 6, as also illustrated in FIG. 30, for permitting estimation of the temperature of the oil in the shock absorber only while the vibration frequency determining means determines that the frequency of vibration of the vehicle is in the low range.

In the above preferred form of the invention, the estimation of the oil temperature by the temperature estimating means is permitted only while the vehicle is running on a road surface that causes vehicle vibration whose frequency falls in the low range. Namely, the magnitude of the vehicle vibration having a relatively low frequency is greater than that of the vehicle vibration having a relatively high frequency. This means that the detecting accuracy of various detecting means such as means for detecting relative displacement of the sprung and unsprung members tends to be lowered, with a result of lowering the oil temperature estimating accuracy of the device while the frequency of the vehicle vibration is relatively high. To assure high accuracy of estimation of the oil temperature, the estimation permitting means is provided to permit the oil temperature estimation only while the vehicle vibration frequency is in the low range, in other words, to inhibit the estimation while the vibration frequency is in the high range. In this form of the temperature estimating device, the temperature estimating means receives a highly reliable input signal to achieve the oil temperature estimation with high accuracy.

In one advantageous arrangement of the above fourth preferred form of the invention, the vibration frequency determining means obtains a low-frequency component of the actual value of vertical acceleration of the sprung member detected at a predetermined interval, by suitably processing (e.g., low-pass filtering) the detected actual acceleration value so that the low-frequency component is lower than the predetermined threshold. An absolute value of the low-frequency component is obtained, and the absolute value is then smoothed (by low-pass filtering, for example). The vibration frequency determining means determines that the vehicle vibration frequency is in the low range, if the smoothed value of the low-frequency component or signal is larger than a predetermined threshold.

In another advantageous arrangement of the fourth form of the invention, the vibration frequency determining means obtains a low-frequency component and a high-frequency component of the actual value of vertical acceleration of the sprung member detected at a predetermined interval, by suitably processing (e.g., low-pass filtering for the low-frequency component, and high-pass filtering for the high-frequency component) the detected actual acceleration value so that the low-frequency component and the high-frequency components are lower and higher than predetermined thresholds, respectively. Absolute values of the low-frequency component and the high-frequency components are obtained, and the absolute values are then smoothed. The vibration frequency determining means determines that the vehicle vibration frequency is in the low range, if the smoothed value of the low-frequency component or signal is larger than a predetermined first threshold and if the smoothed value of the high-frequency component or signal is smaller than a predetermined second threshold.

According to a fifth preferred form of the present invention illustrated in FIG. 31, an actuator 7 is provided for controlling the damping characteristic of the shock absorber, and the temperature estimating means 2 comprises positioning means 8 as indicated in FIG. 31, for placing the actuator in a predetermined position upon estimation of the temperature of the oil in the shock absorber.

The actuator 7 may be a stepping motor or a solenoid-operated or piezoelectric actuator, and may be a rotary or linear actuator.

Usually, the oil temperature of the shock absorber is estimated by the present device when the oil temperature is expected to be low, for example, (1) immediately after the ignition switch of the vehicle is turned on to start the engine, (2) immediately after the oil temperature is once estimated to be low, or (3) immediately after the oil temperature is expected to be lowered for some reason or other after it is once estimated to be high, or immediately after a given condition that should have lowered the oil temperature is established after the oil temperature is once estimated to be high.

In the above fifth preferred form of the temperature estimating device of this invention, the actuator provided for controlling or changing the damping characteristic of the shock absorber is brought to the predetermined position before the estimation of the oil temperature by the oil temperature estimating means is commenced. When the oil temperature in the shock absorber is estimated, oil flow characteristic of the shock absorber such as a flow resistance of the oil within the shock absorber should be known. For instance, the oil flow resistance is represented or determined by the diameter of an orifice or flow restrictor passage, or the cross sectional area of the oil flow of the orifice or passage. The oil flow characteristic of the shock absorber should be known since a variation in the oil flow characteristic results in a variation in the damping characteristic of the shock absorber. In view of this aspect of the shock absorber, the actuator is operated by the positioning means according to the principle of this preferred form of the invention, so that the actuator is brought to the predetermined position in which the oil flow characteristic of the shock absorber is constant and known. Thus, the positioning means assures improved accuracy of estimation of the oil temperature by the temperature estimating means.

There will be described some advantageous arrangements of the positioning means for initially positioning the actuator upon estimation of the oil temperature of the shock absorber, according to the present fifth preferred form of the invention. In these examples, the actuator is initially positioned immediately after the ignition switch of the vehicle is turned on to start the engine.

In one advantageous arrangement, the positioning means is operated to bring the actuator to the predetermined position at the end of each run of the vehicle which is terminated by turning off the ignition switch. Usually, the oil temperature in the shock absorber is not relatively low range, immediately before each vehicle run is terminated. Therefore, the actuator can be smoothly operated to the predetermined position at the end of each vehicle run. It is also noted that the actuator remains at the predetermined position after the last vehicle run is terminated and until the next vehicle run is started. In this arrangement, the end of each vehicle run is detected by determining that the vehicle running speed is zero, since the vehicle speed is zeroed when the vehicle run is ended.

According to another advantageous arrangement of the positioning means, the actuator is operated to the predetermined position at the beginning of each vehicle run, at a speed lower than the nominal speed (at which the actuator is normally operated to control the damping force). Namely, the drive pulses are applied to the actuator at a frequency lower than the nominal frequency, to place the actuator in the predetermined position upon starting of each vehicle run. The application of the drive pulses to the actuator at the relatively lower frequency permits the actuator to provide a drive force or torque larger than the nominal drive force or torque, so that the actuator can be located at the predetermined position even when the oil temperature in the shock absorber is lower than the optimum level.

The present fifth form of the invention is applicable to the various forms of the temperature estimating device which have been described above. Although the device according to the fifth form of the invention is adapted to be suitably used where no means for detecting the operating position of the actuator is provided, the concept of this fifth form of the invention is equally applicable to the device in which such detecting means is provided. In this latter case, the actual position of the actuator is detected by suitable detecting means while the actuator is operated by the positioning means before the oil temperature is estimated, so that the estimation of the oil temperature is started when the detected actual position of the actuator coincides with the predetermined position. Alternatively, a relationship among the oil temperature and damping force of the shock absorber and the relative speed of the sprung and unsprung members is predetermined and stored in a memory, for each operating position of the actuator, and the oil temperature is estimated according to the stored predetermined relationship, on the basis of the detected actual position of the actuator, damping force of the shock absorber and the relative speed of the sprung and unsprung members.

The second object indicated above may be achieved according to a second aspect of the present invention, which provides an apparatus for controlling a damping characteristic of a shock absorber in a suspension system which connects a sprung member and an unsprung member of a motor vehicle, comprising: (a) acceleration detecting means 1 for detecting an actual value of vertical acceleration of the sprung member; (b) an actuator 7 for controlling the damping characteristic of the shock absorber according to a drive signal applied thereto; and (c) a controller 9 for applying the drive signal to the actuator, to thereby operate the actuator for controlling the damping characteristic of the shock absorber. The controller comprises (1) temperature estimating means for estimating a temperature of a working oil in the shock absorber, on the basis of at least the actual value of vertical acceleration of the sprung member detected by the acceleration detecting means, and (2) inhibiting means for inhibiting an operation of the actuator to control the damping characteristic of the shock absorber, when the oil temperature estimated by the temperature estimating means is lower than a predetermined level.

In the present damping characteristic controlling apparatus constructed according to the second aspect of this invention as described above, the oil temperature in the shock absorber is estimated in the same manner as described above with respect to the temperature estimating device constructed according to the first aspect of the invention. While the estimated oil temperature is lower than the suitably predetermined level, the actuator is inhibited from operating to activate the actuator to control the damping characteristic of the shock absorber. Accordingly, the present apparatus is free from the conventionally experienced abnormal operation due to the oil temperature of the shock absorber lower than the predetermined level, that is, does not suffer from inadequate control of the damping characteristic of the shock absorber while the oil temperature is excessively low.

To control the damping characteristic of the shock absorber, the drive signal to be applied from the controller to the actuator is determined, (1) such that the bouncing, rolling, pitching and undesirable behaviors of the vehicle body can be reduced, on the basis of input signals indicative of various parameters such as the actual vertical acceleration of the sprung member, vehicle speed and vehicle steering angle, or (2) such that the damping characteristic is adjusted as desired by the vehicle operator, depending on a command generated by the vehicle operator's manipulation of a suitable switch, for example.

According to one preferred form of this second aspect of the present invention, the temperature estimating means of the controller 9 continues to estimate the temperature of the oil and the inhibiting means continues to inhibit the operation of the actuator to control the damping characteristic as long as the temperature of the oil estimated is lower than the predetermined level. However, the controller permits the operation of the actuator when the estimated temperature of the oil is higher than the predetermined level.

In the above form of the apparatus, the oil temperature of the shock absorber is continuously estimated according to the same rule, and the actuator is held at rest until the oil temperature rises above the predetermined level. In other words, the control of the damping characteristic of the shock absorber is effected only while the estimated oil temperature is higher than the predetermined threshold, so that the damping characteristic is adequately controlled.

In one advantageous arrangement of the above form of the apparatus, the temperature estimating means of the controller terminates estimation of the temperature of the oil when the controller permits the operation of the actuator, the controller further comprising estimation resuming means operable after the operation of the actuator is permitted, for determining whether a condition that should have lowered the temperature of the oil above the predetermined level has been established, and resuming the estimation of the temperature of the oil when it is determined that said condition has been established.

In the above arrangement, the condition that should have lowered the oil temperature below the predetermined level may be a condition in which the vehicle is held at a stop with the ignition switch kept on for more than a predetermined time after the oil temperature is once estimated to be higher than the predetermined level. The oil temperature which has once been raised above the predetermined level may be lowered below the predetermined level if the vehicle is held stopped for a relatively long time at a relatively low ambient temperature. Thus, the estimation resuming means is effective to prevent inadequate control of the damping characteristic when the oil temperature is lowered below the predetermined level in such situation.

The apparatus according to the above advantageous arrangement does not suffer from abnormal or inadequate control of the damping characteristics of the shock absorber, since the estimation of the oil temperature is resumed if the actual oil temperature is supposed to be lowered below the predetermined level, and the operation of the actuator is inhibited if the estimated oil temperature is lower than the predetermined level. This arrangement is effective even where the apparatus is adapted such that the estimation of the oil temperature is not effected after the operation of the actuator to control the damping characteristic is once permitted, that is, after the estimated temperature is once estimated to be higher than the predetermined level.

According to another preferred form of the second aspect of the invention, the temperature estimating means of the controller 9 terminates estimation of the temperature of the oil and the inhibiting means inhibits the operation of the actuator when the temperature of the oil is estimated to be lower than the predetermined level for the first time, the controller determining whether a condition that should have raised the temperature of the oil above the predetermined level has been established, and permitting the operation of the actuator to control the damping characteristic of the shock absorber when it is determined that the condition has been established.

In the above form of the apparatus, the estimation of the oil temperature is terminated and the operation of the actuator is inhibited when the oil temperature is estimated to be lower than the predetermined level for the first time. Then, a determination is made as to whether a condition that should have raised the oil temperature has been established. The operation of the actuator to control the damping characteristic of the shock absorber is permitted if it is determined that the above condition has been established. That is, before the initial estimation of the oil temperature is effected based on a phenomenon that the damping force increases with a drop of the oil temperature. However, once the oil temperature is estimated to be lower than the predetermined level for the first time, the oil temperature is estimated to be higher than the predetermined level, depending upon whether the condition that should have raised the oil temperature has been established. This means that the determination as to whether the oil temperature is raised above the predetermined level can be effected irrespective of the actual operating position of the actuator, namely, regardless of a decrease of the damping force of the shock absorber.

The apparatus according to the above preferred form of the invention is effective to avoid unnecessary inhibition of the control of the damping characteristic, since the control of the damping characteristic is permitted after a rise of the actual temperature above the predetermined level, even where the apparatus is adapted such that the estimation of the oil temperature is not effected after the operation of the actuator to control the damping characteristic is once inhibited, that is, after the estimated temperature is once estimated to be lower than the predetermined level.

Examples of a parameter to detect the condition that should have raised the oil temperature include (1) a cumulative running time of the vehicle exceeding a predetermined threshold, after the oil temperature is estimated to be lower than the predetermined level and while the running speed of the vehicle is not zero, (2) a cumulative operating time of the piston of the shock absorber exceeding a predetermined threshold, after the oil temperature is estimated to be lower than the predetermined level and while the operating speed of the piston is higher than a given value, and (3) a cumulative absolute value of the operating speed of the piston of the shock absorber after the oil temperature is estimated to be lower than the predetermined level.

In one advantageous arrangement of the above preferred form of the apparatus according to the second aspect of this invention, the controller 9 comprises parameter changing means 10 as illustrated in FIG. 33, which is operable on the basis of the temperature of the oil estimated by the temperature estimating means, for changing a reference value used in determining whether the condition has been established.

To determine whether the above-indicated condition has been established, a suitable parameter such as the cumulative running time of the vehicle, cumulative operating time of the shock absorber piston or cumulative absolute value of the piston operating speed referred to above is compared with a threshold value. This threshold value is changed so as to increase with an increase in the tendency of deviation of the detected actual acceleration value of the sprung member from the reference value.

In the above arrangement, the operation of the actuator to control the damping characteristics of the shock absorber is permitted when it is determined that the condition which should have raised the oil temperature above the predetermined level has been established. If the threshold value of the parameter used to monitor this condition remained constant, the operation of the actuator would be commenced even before the actual oil temperature is raised above the predetermined level, or the operation of the actuator would not be commenced even after the actual oil temperature is raised well above the predetermined level. However, the present arrangement is adapted such that the threshold value of the parameter is adjusted to meet the oil temperature at the moment when the oil temperature is estimated to be lower than the predetermined level. This arrangement assures commencement of the operation of the actuator at a suitable point of time, or avoids premature or delayed commencement of the operation of the actuator, and prevents inadequate control of the damping characteristic and unnecessary inhibition of the operation of the actuator.

According to a further preferred form of the second aspect of this invention, the controller applies drive pulses as the drive signal to the actuator at a nominal frequency to operate the actuator for controlling the damping characteristic of the shock absorber, the controller comprising preliminary actuator driving means operable after the operation of the actuator is permitted, for applying drive pulses to the actuator at a frequency lower than the nominal frequency before the actuator is operated to control the damping characteristic.

In the above form of the invention, the actuator is not started to control the damping characteristic of the shock absorber immediately after its operation is permitted. That is, the actuator is subjected to a preliminary or run-in operation two or more times for the purpose of improving the run-in condition of the sliding surfaces within the shock absorber. This preliminary operation is effected at a speed lower than the nominal operating speed of the actuator, that is, with drive pulses applied to the actuator at a frequency lower than the nominal frequency used during the normal operation to control the damping characteristic of the shock absorber. The application of the drive pulses at the relatively low frequency assures a relatively large drive force or torque in the preliminary operation, than in the normal operation of the actuator. Thus, the present apparatus assures adequate operation of the actuator to control the damping characteristic from the very beginning of the normal operation following the preliminary operation.

The second object indicated above may also be achieved according to a third aspect of this invention, which provides an apparatus for controlling a damping characteristic of a shock absorber in a suspension system which connects a sprung member and an unsprung member of a motor vehicle, comprising, as illustrated in FIG. 35: (a) acceleration detecting means 1 for detecting an actual value of vertical acceleration of the sprung member; (b) an actuator 7 for controlling the damping characteristic of the shock absorber according to drive pulses applied thereto; and (c) a controller 12 for applying the drive pulses to the actuator, to thereby operate the actuator for controlling the damping characteristic of the shock absorber. The controller comprises (1) temperature estimating means for estimating a temperature of a working oil in the shock absorber, on the basis of at least the actual value of vertical acceleration of the sprung member detected by the acceleration detecting means, and (2) means for changing the frequency at which the drive pulses are applied to the actuator such that the frequency is lower when the oil temperature estimated by the temperature estimating means is relatively low than when the oil temperature estimated is relatively high.

In the apparatus constructed according to the third aspect of the invention described above, the oil temperature of the shock absorber is estimated in the same manner as described above with respect to the oil temperature estimating device constructed according to the first aspect of the invention. The actuator is operated at a relatively low speed with the drive pulses being applied thereto at a relatively low frequency when the estimated oil temperature is relatively low, and at a relatively high speed with the drive signals being applied at a relatively high frequency when the estimated oil temperature is relatively high.

When the actual oil temperature of the shock absorber is relatively low, a relatively large drive force or torque should be generated by the actuator to control the damping characteristic of the shock absorber. To this end, the drive pulses are applied to the actuator at a frequency lower than the nominal frequency at which the drive signals are applied while the oil temperature is in the optimum or high range. Although it is possible to apply the drive signals always at the relatively low frequency irrespective of the oil temperature, this arrangement suffers from the following drawbacks when the oil temperature is relatively high. For instance, where the actuator is a stepping motor, the frequency of the drive pulses would be unnecessarily low when the oil temperature is sufficiently high. This may cause a vibrating non-smooth motion of the rotor of the stepping motor, leading to the generation of noises and/or oscillatory movements of the vehicle body. In view of these drawbacks, the present apparatus is adapted to change the frequency at which the drive pulses are applied to the actuator, depending on the oil temperature or the oil viscosity, more specifically, such that the frequency is lower when the oil temperature is relatively low than when the oil temperature is relatively high. Thus, the actuator may be smoothly operated irrespective of a variation in the oil temperature of the shock absorber.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIGS. 26–35 are views schematically showing arrangements of various forms of this invention.

DETAILED DESCRIPTION OF THE PREFERRED EMBODIMENTS

Referring first to FIGS. 1–9, there will be described the first embodiment of this invention.

Figure 1:
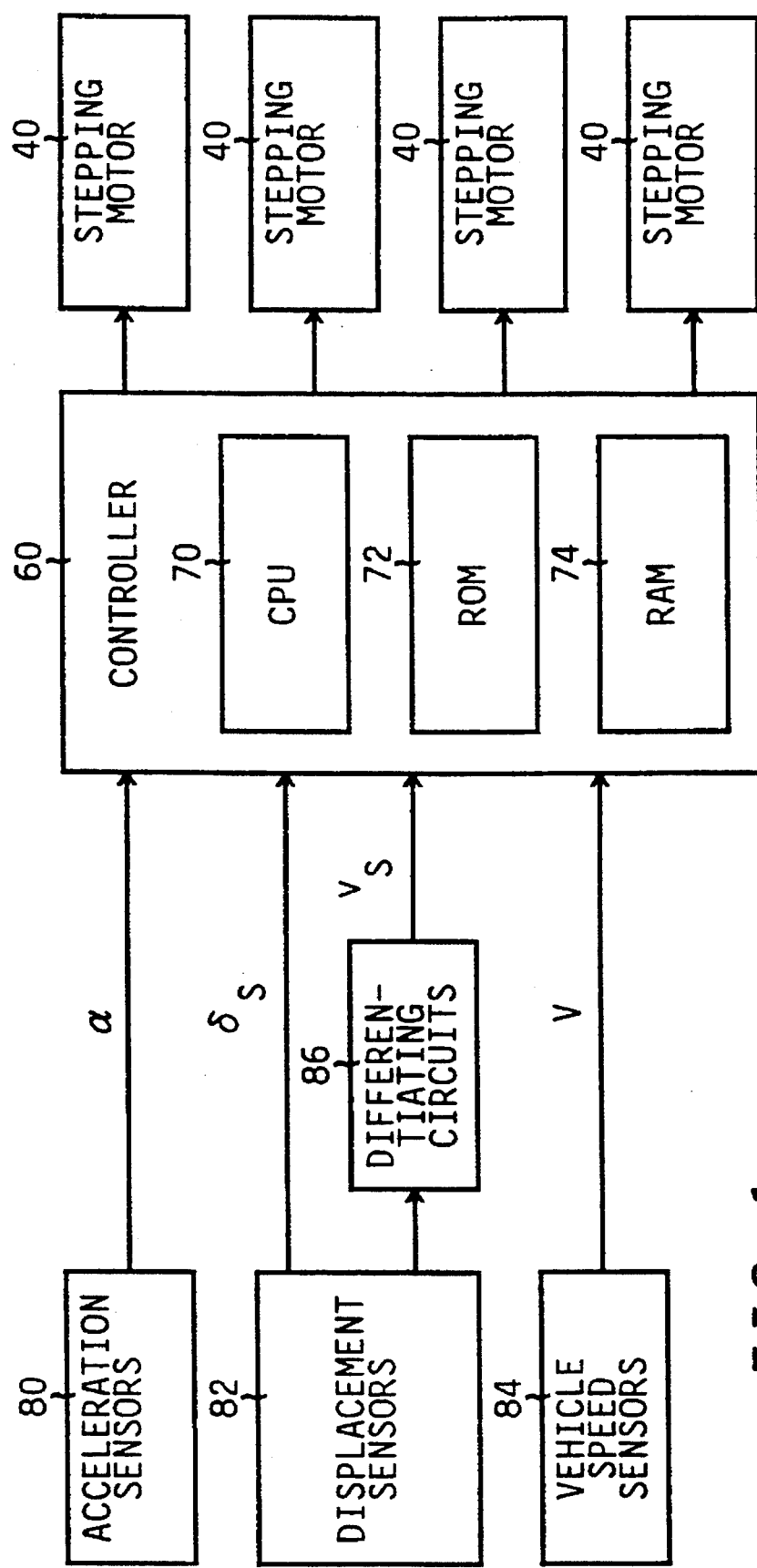
FIG. 1 is a block diagram schematically illustrating an electric system of a damping force control apparatus for a shock absorber, which is constructed according to one embodiment of this invention and which incorporates a device for estimating the temperature of a working oil in the shock absorber.

The present first embodiment takes the form of a damping force control apparatus for a shock absorber used in a semi-active suspension system on a four-wheel motor vehicle. The apparatus incorporates a device for estimating the temperature of a working fluid or oil in the shock absorber. As schematically illustrated in FIG. 1, the apparatus uses a controller 60 adapted to control the damping characteristic of the shock absorber partly illustrated in FIG. 2, on the basis of at least vertical acceleration α of a sprung mass of the vehicle, which is detected by an acceleration sensor 80. The shock absorber is provided in a suspension system which flexibly connects the sprung mass (weight) and unsprung mass (weight) of the vehicle.

As well known in the art, the shock absorber includes a piston which slidably engages a cylinder. The piston divides the interior space of the cylinder into an upper chamber and a lower chamber which are filled with the working oil. The upper and lower chambers communicate with each other through a relatively restricted passage, which is formed through the piston, for example. A rod extends from the piston such that the rod is concentric with the piston.

Figure 2:
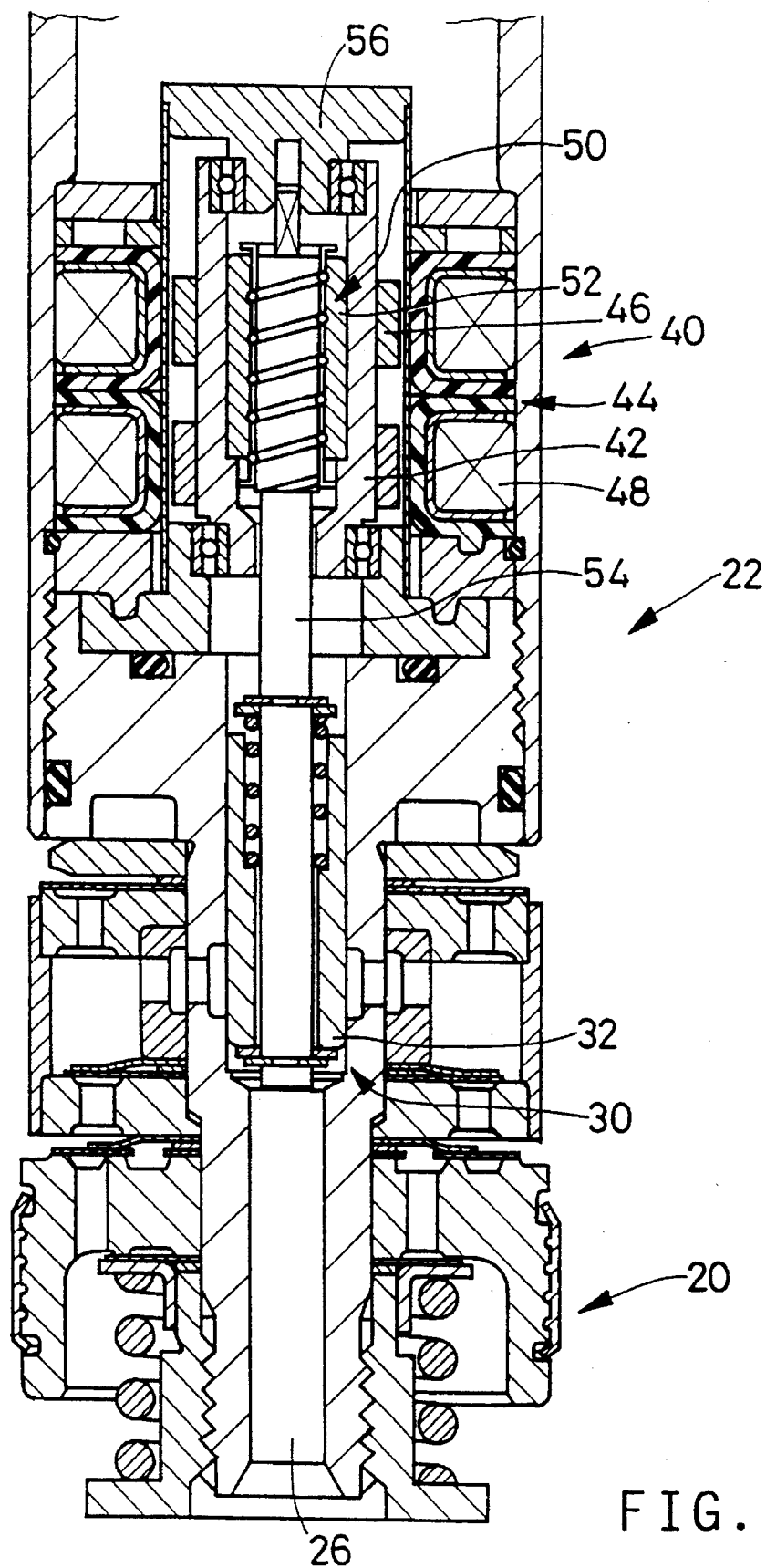
FIG. 2 is a fragmentary elevational view in longitudinal cross section of the shock absorber the oil temperature of which is estimated by the estimating device of FIG. 1, showing a piston and a rod of the shock absorber.

An example of such damping force control apparatus is also partly shown in the cross sectional view of FIG. 2, wherein the piston and rod are indicated generally at 20 and 22, respectively. In the present embodiment, a valve device is provided to change an effective cross sectional area of oil flow of a passage 26, to thereby control the damping characteristic of the shock absorber, more specifically, a relationship between a damping force f and a relative speed $v_S$. The relative speed $v_s$ means a rate of change of relative displacement $\delta_S$ of the sprung and unsprung masses of the vehicle. The valve device is operated by an actuator through a suitable transmission mechanism. In the present apparatus, the valve device, transmission mechanism and actuator are accommodated within the rod 22.

The valve device takes the form of a spool valve device 30, which is disposed part way through the passage 26. The device 30 uses a portion of the rod 22 as a housing, and includes a spool 32 slidably received in the housing. The cross sectional area of flow of the passage 26 is changed depending upon the position of the spool 32 in its axial or longitudinal direction.

The actuator takes the form of a stepping motor 40 which includes a rotor 42 and a stator 44. Permanent magnets 46 are fixed to the rotor 42, while electromagnets 48 are fixed to the stator 44. The stepping motor 40 is of a so-called "wet type" wherein an annular rotor chamber defined between the stator 44 and the rotor 42 communicates with the oil chambers of the cylinder of the shock absorber through a clearance left between an externally threaded member 54 (which will be described) and the housing of the rod 22.

The transmission mechanism takes the form of a motion converting mechanism for converting a rotary motion of the stepping motor 40 into a linear motion (axial motion) of the spool 32 of the spool valve device 30. In the present embodiment, a ballscrew mechanism 50 is used as the motion converting mechanism. The ballscrew mechanism 50 includes: an internally threaded member 52 rotating with the rotor 42; the above-indicated externally threaded member 54 which engages the internally threaded member 52 through recirculating balls; and a support member 56 which supports the externally threaded member 54 axially slidably while inhibiting rotation thereof. A rotary motion of the internally threaded member 52 by the stepping motor 40 is converted into a linear axial motion of the externally threaded member 54 to which the spool 32 is fixed.

Referring back to FIG. 1, the controller 60 is adapted to control four stepping motors 40 each constructed as described above and used for the corresponding one of four shock absorbers each provided on the vehicle and constructed as described above, so that the damping characteristic of each shock absorber can be regulated by the controller 60 through the stepping motor 40. The four shock absorbers and four stepping motors 40 correspond to the respective four wheels of the vehicle. The controller 60 is principally constituted by a computer which incorporates a central processing unit (CPU) 70, a read-only memory (ROM) 72 and a random-access memory (RAM) 74. The controller 60 receives output signals of four acceleration sensors 80, four displacement sensors 82, a vehicle speed sensor 84, and four differentiating circuits 86. Each acceleration sensor 80 is disposed on a sprung member of the vehicle associated with the corresponding vehicle wheel. The output signal of the acceleration sensor 80 represents the vertical acceleration α of the sprung member. Each displacement sensor 82 is connected with the sprung member and an unsprung member associated with the corresponding wheel. The output signal of the displacement sensor 82 represents a relative displacement $\delta_S$ of the sprung and unsprung members. The four differentiating circuits 86 are connected to the corresponding displacement sensors 82, so that the relative displacement $\delta_S$ is differentiated to generate the relative speed $v_S$. The output signal of the vehicle speed sensor 84 represents a running speed V of the vehicle.

Figure 3:
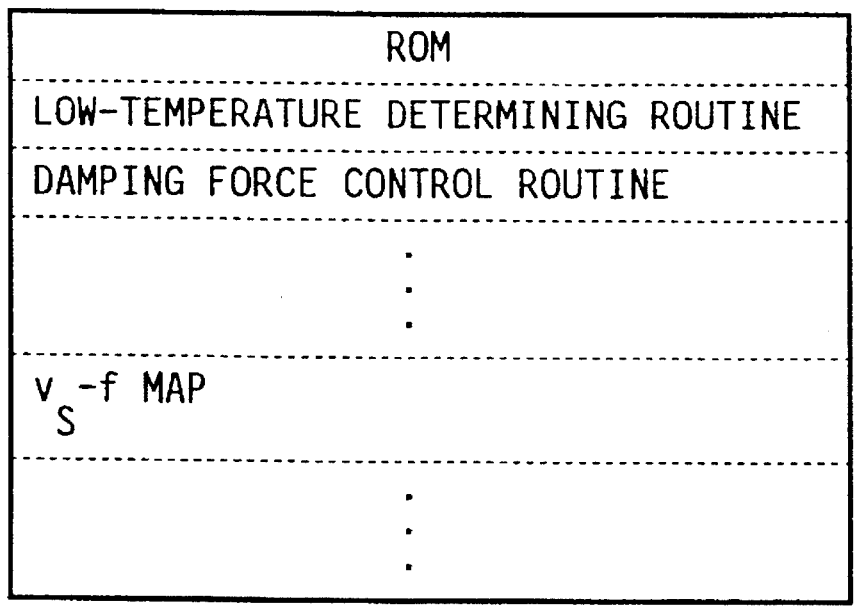
FIG. 3 is a view schematically showing an arrangement of a ROM 72 provided in a controller used in the damping force control apparatus of FIG. 1.
Figure 4:
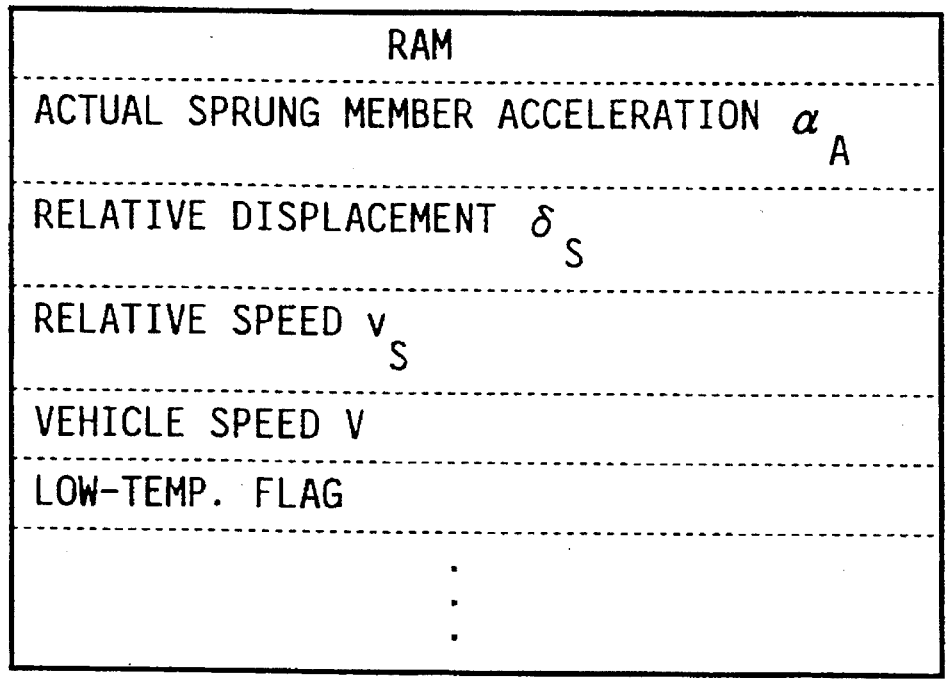
FIG. 4 is a view schematically showing an arrangement of a RAM 74 provided in the controller shown in FIG. 1.

The ROM 72 and the RAM 74 provided in the controller 60 are arranged as shown in FIGS. 3 and 4, respectively. As shown in FIG. 3, the ROM 72 stores various control programs such as a TEMPERATURE MONITORING routine as illustrated in the flow chart of FIG. 5, and a DAMPING FORCE CONTROL routine as illustrated in the flow chart of FIG. 6. These routines will be described below. The ROM 72 also stores various data maps such as a $v_S$-f map representative of a relationship between the relative speed $v_s$ and the damping force f of the shock absorber.

As illustrated in FIG. 4, the RAM 74 have memories for storing various data, such as the output signals of the sensors 80, 82, 84 and the circuits 86 which represent an actual sprung member acceleration $α_A$, relative displacement $\delta_S$, vehicle speed V and relative speed $v_s$. The RAM 74 also has memories for storing various flags such as a LOW-TEMP. flag. The controller 60 controls the stepping motor 40 so as to regulate the damping characteristic of the shock absorber for each wheel of the vehicle, with the CPU 70 executing the control programs stored in the ROM 72 while utilizing a temporary data storage function of the RAM 74.

When the temperature of the working oil in the shock absorber is relatively low, for example, within a range between about −20° C. and about −10° C., the oil has a relatively high viscosity value, and provides a relatively high resistance to the rotation of the rotor 42 upon application of a drive signal to the stepping motor 40. Consequently, the stepping motor 40 may be unable to operate against the resistance of the highly viscous working oil, and may fall in an out-of-synchronism state (synchronism loss state). The highly viscous oil present between the spool 32 and the rod 22 provides a relatively large resistance to a movement of the spool 32 relative to the rod 22, causing an increase in a load acting on the stepping motor 40. Further, the highly viscous oil in the rotor chamber provides a relatively large resistance to a rotating movement of the rotor 42 relative to the stator 44, also causing an increase in the load on the motor 40. To avoid the operation of the stepping motor 40 at such a low temperature of the working oil in the shock absorber, the TEMPERATURE MONITORING routine is executed to determine whether the temperature of the oil is excessively low or not, and to inhibit the application of the drive signal to the stepping motor 40 or inhibit the damping force control of the shock absorber in the DAMPING FORCE CONTROL routine, in the event that the oil temperature is excessively low or lower than a predetermined threshold.

The monitoring or determination of the oil temperature utilizes the following facts:

(1) Generally, the oil temperature is excessively low only for an initial period of an operation of the vehicle initiated by the activation of an ignition switch to start the vehicle engine, namely, only for a short time immediately after the start of each run of the vehicle.

(2) There exists a known relationship among the oil temperature, relative speed $v_S$ and damping force f. That is, the damping force f of the shock absorber increases with an increase in the relative speed $v_S$ of the sprung and unsprung members, and with a decrease in the temperature of the working oil in the shock absorber.

Figure 7:
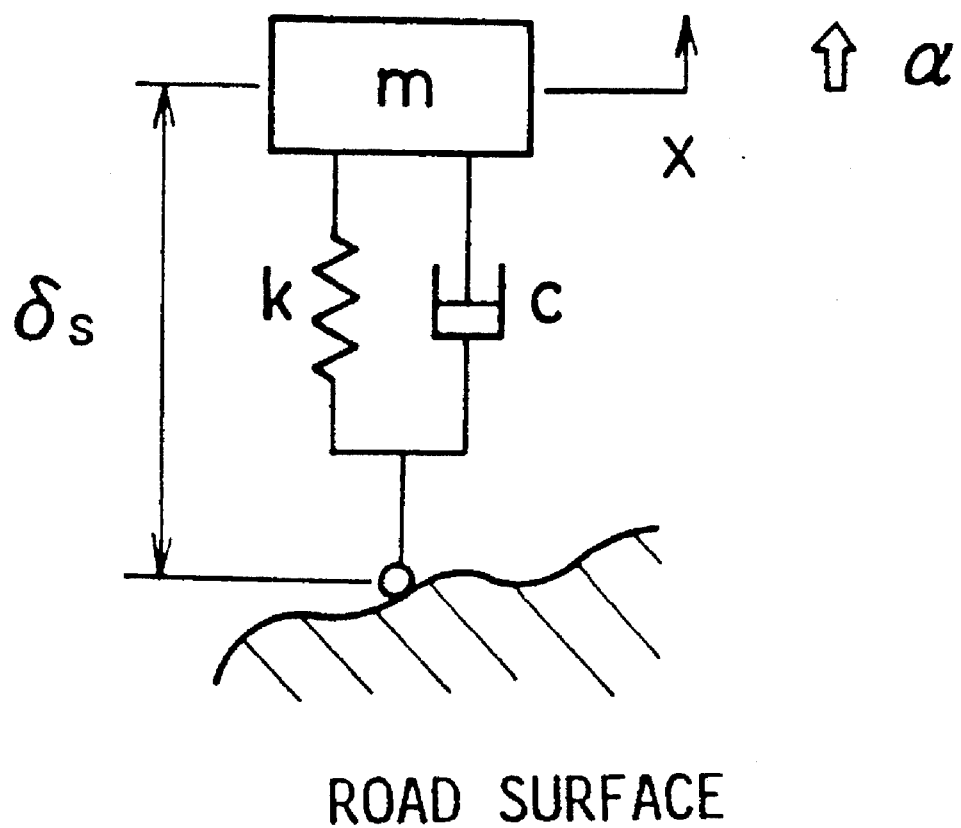
FIG. 7 is a view showing a model of a vibration system in a vehicle suspension system.

(3) There exists a known relationship among the vertical acceleration a of the sprung member, damping force f and relative displacement $\delta_S$. That is, the sprung member, the unsprung member and a suspension device connecting the sprung and unsprung members constitute a motion system, which may be modelled as illustrated in FIG. 7. The motion of the sprung member satisfies the following equation (1):

$$m\alpha = -(c \cdot v_S + k \cdot \delta_S) = -(f + k \cdot \delta_S) \quad (1)$$

where, m: ¼ of the vehicle sprung mass (constant)

c: damping coefficient of the shock absorber k: spring constant of the suspension spring While the determination of the temperature of the oil in the shock absorber is effected on the basis of the above facts, it is noted that the damping force characteristic of the shock absorber is variable, namely, the operating position of the stepping motor 40 for changing the cross sectional area of oil flow of the passage 26 is variable. On the other hand, the damping force control apparatus does not use a sensor for detecting the operating position of the stepping motor 40, and it is not possible to know the actual operating position of the motor 40 with high accuracy. Although it is possible to estimate the operating position of the motor 40 based on the drive signal applied to the motor 40, the drive signal does not indicate the correct position of the motor 40 in the event of a synchronism loss of the motor. Therefore, it is not possible to know exactly the operating position of the motor 40 from the drive signal applied thereto.

In view of the above, the present embodiment is adapted to effect the determination of the oil temperature of each shock absorber during an initial period of each vehicle run, and to assure that the stepping motor 40 is positioned at a predetermined zero point at the beginning of each vehicle run. This aspect will be described below in detail. Briefly described here, the stepping motor 40 is mechanically returned to its predetermined zero point at the end of each vehicle run so that the motor 40 is always positioned at the zero point immediately after the vehicle is started.

Figure 8:
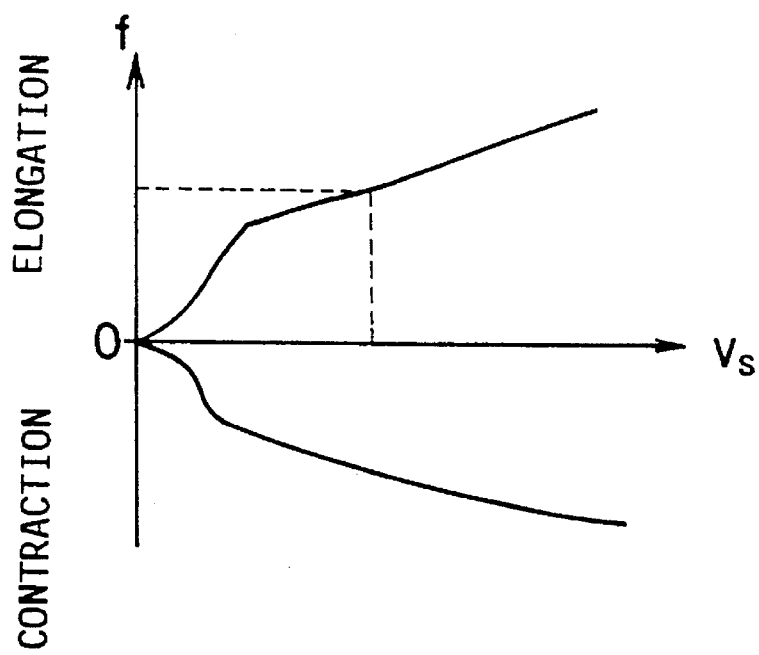
FIG. 8 is a graph indicating a relationship between a relative speed $v_S$ and an ideal damping force f, which is stored as data map in the ROM 72 of FIG. 3.

The oil temperature is monitored or determined in the following manner, which will be referred to as "relative estimation method" of the oil temperature. According to this relative estimation method, the oil temperature is determined to be low if the actual value of the acceleration α of the sprung member has a relatively high tendency of being larger than an ideal value of the sprung member acceleration a which is expected to occur when the oil temperature is in an optimum range (e.g., between about 20° C. and about 30° C.). This optimum range will be referred to also as "high range" where appropriate. The relative estimation method uses a relationship between the relative speed $v_S$ and the damping force f, which exists when the oil temperature is in the optimum range. This $v_S$-f relationship is stored in the ROM 72 as indicated above. An example of the $v_S$-f relationship is shown in FIG. 8.

A sequence of events to monitor the oil temperature according to the relative estimation method will be explained.

Initially, the damping force f is determined on the basis of the currently detected relative speed $v_S$, according to the $v_S$-f relationship. Namely, the damping force f expected to be produced by the shock absorber when the oil temperature is in the optimum range is determined as an ideal damping force $f_R$.

Then, the current sprung member acceleration α is calculated on the basis of the ideal damping force $f_R$ and the relative displacement $\delta_S$, according to the equation (1) indicated above. The acceleration α of the sprung member thus calculated is the ideal value $\alpha_R$ of the acceleration α which is expected to occur when the oil temperature is in the optimum range.

Successively, a determination is made as to whether an actual acceleration value $\alpha_A$ of the sprung member is larger than the ideal acceleration value $\alpha_R$. If the oil temperature is low, the damping force f will be larger than the nominal value even if the spool 32 (motor 40) is in the zero or original point. In this case, the actual acceleration value $\alpha_A$ tends to be larger than the ideal acceleration value $\alpha_R$.

To effect the oil temperature monitoring or determination according to the relative estimation method described above, the TEMPERATURE MONITORING routine stored in the ROM 72 is executed as described below in detail by reference to the flow chart of FIG. 5.

The present routine is started when the ignition switch is turned on to start the vehicle engine.

The routine is initiated with step S11 in which a counter CNT, time $t_M$ and LOW-TEMP. flag (which will be described) are initialized. That is, the counter CNT and time $t_M$ are reset to "0" while the flag is reset to "1".

The control flow then goes to step S12 to read in the actual sprung member acceleration $\alpha_A$, relative displacement $\delta_S$ and relative speed $v_S$, and store these data in the RAM 74. Step S12 is followed by step S13 in which the value of the damping force f corresponding to the current value of the relative speed $v_s$ is determined as the ideal damping force $f_R$, according to the $v_S$-f map stored in the ROM 72. Then, step S14 is implemented to calculate the ideal sprung member acceleration $\alpha_R$ on the basis of the ideal damping force $f_R$ and the relative displacement $\delta_S$, and according to the above equation (1).

The control flow then goes to steps S15–S21 to determine whether the actual sprung member acceleration $\alpha_A$ has a relatively high tendency of being larger than the ideal value $\alpha_R$. These steps S15–S21 are assigned to compare the actual and ideal values $\alpha_A$ and $\alpha_R$ of the acceleration $\alpha$ of the sprung member.

Figure 9:
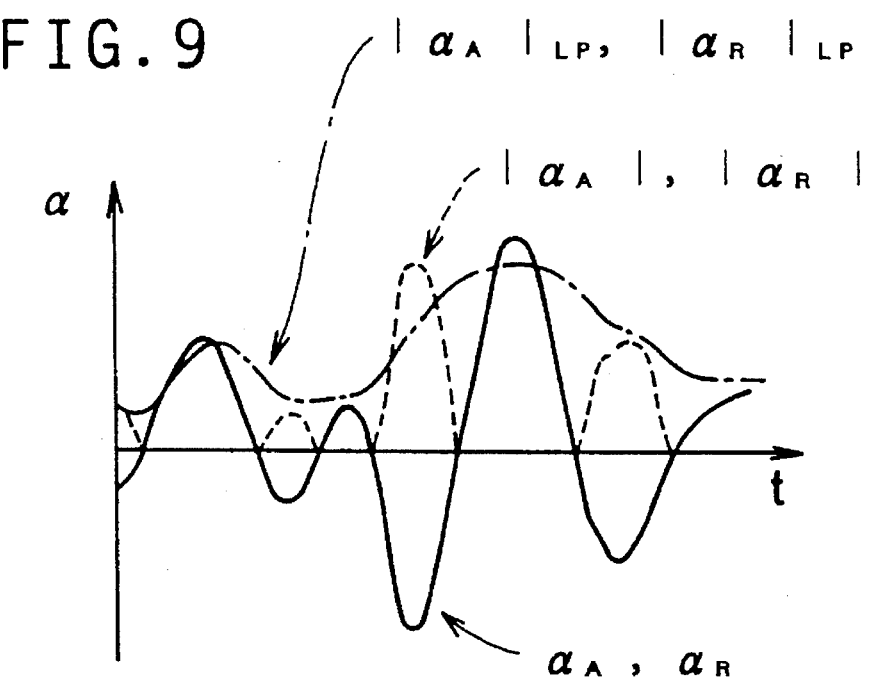
FIG. 9 is a graph for explaining signal processing in the temperature monitoring routine of FIG. 5.

The values $\alpha_A$ and $\alpha_R$ may take either a positive value or a negative value and vibrate at a relatively high frequency. These values $\alpha_A$ and $\alpha_R$ may be influenced by errors that may be included therein, and therefore are not directly compared to each other, that is, subjected to processing steps for first obtaining the absolute values [$|\alpha_A|$ and $|\alpha_R|$] and then smoothing these absolute values by low-pass filtering, for example. The monitoring of the oil temperature is effected based on a result of comparison of these smoothed values. For instance, the signals representative of the actual and ideal acceleration values $\alpha_A$ and $\alpha_R$ as obtained in steps S12 and S14, which are indicated by solid line in FIG. 9, are first converted into absolute value signals representative of $|\alpha_A|$ and $|\alpha_R|$ indicated by dashed line, which are then converted into smoothed signals representative of smoothed values $|\alpha_A|_{LP}$ and $|\alpha_A|_{LP}$. That is, the original values $\alpha_A$, $\alpha_R$ are eventually converted into the smoothed values $|\alpha_A|_{LP}$ and $|\alpha_R|_{LP}$ to be compared, which smoothed values are represented by curves indicated by one-dot chain line. These curves are defined generally by the peaks of the absolute value signals indicated by dashed line, such that the curves smoothly connect the peaks along the horizontal axis, that is, the axis of time "t".

It is possible to determine that the actual acceleration value $\alpha_A$ has a tendency of being larger than the ideal acceleration value $\alpha_R$, as soon as a single comparison has revealed that the smoothed actual value $\alpha_A$ is larger than the smoothed ideal value $\alpha_R$, However, the final determination based on the single comparison of the smoothed values $\alpha_A$ and $\alpha_R$ is not sufficiently reliable. To improve the reliability of the determination, the present embodiment uses the counter CNT which counts the number of those cycles of the routine implemented during a predetermined sampling time period $T_M$, in which a difference $|\alpha_A|_{LP}-|\alpha_R|_{LP}$ is larger than a threshold value "A". If and when the count of the counter CNT becomes larger than a predetermined threshold "N", it is determined that the actual acceleration value $\alpha_A$ has a high tendency of being considerably larger than the ideal acceleration value $\alpha_R$, and it is determined that the oil temperature is low. In this case, the determination of the oil temperature based on the comparison of the values $\alpha_A$ and $\alpha_R$ is repeated, since it is highly possible that the oil temperature is still low in the next sampling period $T_M$. If the count of the counter CNT is smaller than the threshold "N" upon expiration of the sampling period $T_M$, it is determined that the oil temperature is in the high or optimum range, and the present routine is terminated. The routine will not be executed during the remaining period of the vehicle run in question, namely, the routine will be executed when the ignition switch is turned on again to start the next vehicle run after it is turned off at the end of the present vehicle run. Thus, the present routine is based on the assumption that the oil temperature would not become low after it is once raised into the optimum or high range.

Steps S15–S21 which have been summarized above will be described in detail. Step S15 is provided to obtain the absolute values $|\alpha_A|$ and $|\alpha_R|$ of the actual and ideal acceleration values $\alpha_A$ and $\alpha_R$, Step S15 is followed by step S16 in which the absolute values $|\alpha_A|$ and $|\alpha_R|$ are smoothed by low-pass filtering. For instance, the absolute value $|\alpha_A|$ is smoothed to $|\alpha_A|_{LP}$, according to the following equation (2):

$$|\alpha_A|_{LP}=a\cdot|\alpha_A|+(1-a)\cdot|\alpha_A|_{LP} \qquad (2)$$

Similarly, the absolute value $|\alpha_R|$ is smoothed to $|\alpha_R|_{LP}$, according to the following equation (3):

$$|\alpha_R|_{LP}=a\cdot|\alpha_A|+(1-a)\cdot|\alpha_R|_{LP} \qquad (3)$$

Then, the control flow goes to step S17 to determine whether the difference $|\alpha_A|_{LP}-|\alpha_R|_{LP}$ is larger than the predetermined threshold "A" (positive value). If an affirmative decision (YES) is obtained in step S17, step S18 is implemented to increment the count of the counter CNT. If a negative decision (NO) is obtained in step S17, step S18 is skipped. In either case, the control then goes to step S19 in which the time $t_M$ is increased by a predetermined amount $\Delta t_M$. Namely, the time $t_M$ is measured. Then, step S20 is implemented to determine whether the currently measured time $t_M$ is equal to or longer than the predetermined sampling time period $T_M$. If a negative decision (NO) is obtained in step S20, the control returns to step S12. If an affirmative decision (YES) is obtained in step S20, the control flow goes to step S21 to determine whether the current count of the counter CNT is larger than the predetermined threshold "N" or not. If an affirmative decision (YES) is obtained in step S21, it is determined that the oil temperature is in the low range (e.g., $-20°$ C. to $-10°$ C.). In this case, step S22 is implemented to reset the counter CNT and the time $t_M$ to "0", and then the control returns to step S12 to repeat the comparison of the actual and ideal acceleration values $\alpha_A$ and $\alpha_R$, If the count of the counter CNT upon expiration of the sampling time $T_M$ detected in step S20 is not larger than the threshold "N", that is, if a negative decision (NO) is obtained in step S21, it is determined that the oil temperature is not low, and step S23 is implemented to reset the LOW-TEMP. flag to "0", and the routine is terminated The TEMPERATURE MONITORING routine of FIG. 5 is executed for each of the four shock absorbers corresponding to the respective four wheels. The parameters $\alpha_A$, $\delta_S$, $v_S$, etc. and the LOW-TEMP. flag are stored in the RAM 74, for each of the four wheels.

In the present embodiment, the sprung mass "m" used in the above equation (1) is a fixed value, since it was confirmed by experiment that a variation in the vehicle body weight have substantially no influences on the relationship between the actual and ideal values $\alpha_A$ and $\alpha_R$ of the acceleration $\alpha$ of the sprung member.

The present embodiment is also adapted such that at the end of each run of the vehicle the stepping motor 40 is returned to the predetermined zero or original position in which the spool 32 is axially located at a position for fully opening the passage 26. In other words, the stepping motor 40 is initially positioned for a maximum flow of the oil through the passage 26 so as to cause the shock absorber to exhibit the softest damping characteristic, so that the viscosity of the oil has a largest influence on the difference between the actual and ideal acceleration values $\alpha_A$ and $\alpha_R$, in order to improve the reliability of the monitoring or determination of the oil temperature in the shock absorber.

The DAMPING FORCE control routine is provided to automatically control the damping characteristic of the shock absorber on the basis of at least the actual acceleration value $\alpha_A$ of the sprung member, for example, according to a so-called "Sky Hook" theory.

The routine is formulated to inhibit the control of the damping characteristic of the shock absorber as long as the oil temperature is determined to be low. If the stepping motor 40 is activated when the oil temperature is low, the motor 40 may fall in the out-of-synchronism state, failing to control the damping characteristic of the shock absorber as needed.

The control of the damping characteristic of the shock absorber is inhibited when the vehicle speed V is zero, even if it is determined that the oil temperature is not low. In this case, the motor 40 is returned to its zero point. In other words, the motor 40 is returned to its zero point when the vehicle speed V is lowered to zero, so that (1) the motor 40 is at the zero point when the TEMPERATURE MONITORING routine is commenced immediately after the start of each run of the vehicle, and so that (2) the motor 40 is zeroed upon termination of each vehicle run to have the motor 40 positioned at its zero point upon commencement of the next vehicle run, and in view of the fact that each vehicle run is terminated with the vehicle speed V being zeroed. It will be understood that the determination whether each vehicle run is terminated is effected in the present embodiment, by determining whether the vehicle speed V is zero or not.

The stepping motor 40 is provided with a stopper for inhibiting the rotation of the rotor 42 in the direction to increase the cross sectional area of flow of the passage 26 when the motor 40 is placed at its zero point. More specifically described, the stopper includes mutually engageable stop members which are provided, for example, on the rotor and stator 42, 44, respectively. These stop members are brought into abutting engagement with each other irrespective of the rotary position of the rotor 42, when the stepping motor 40 is activated to effect its zero return.

Referring to the flow chart of FIG. 6, the DAMPING FORCE CONTROL routine will be described in detail.

The routine is started immediately after the ignition switch of the vehicle is turned on, and is repeatedly executed until the ignition switch is turned off.

The routine is initiated with step S41 to read in the LOW-TEMP flag from the RAM 74. Step S41 is followed by step S42 to determine whether the LOW-TEMP. flag is set at "1" or not, that is, whether the oil temperature in the shock absorber has been determined to be low by execution of the TEMPERATURE MONITORING routine. If the flag is not set at "1", namely, if a negative decision (NO) is obtained in step S42, the control flow goes to step S43 to read in the vehicle running speed V as detected by the vehicle speed sensor 84. Step S43 is followed by step S44 to determine whether the vehicle speed V is zero or not. If the vehicle speed V is not zero, namely, if a negative decision (NO) is obtained in step S44, step S45 is implemented to apply a drive signal to the stepping motor 40 for controlling the damping characteristic of the shock absorber as well known in the art. Then, the control returns to step S41.

If the LOW-TEMP. flag is set at "1", that is, if the oil temperature of the shock absorber has been determined to be low, an affirmative decision (YES) is obtained in step S42, and the control returns to step S41, whereby step S43 and the following steps are not implemented. In other words, the control of the damping characteristic of the shock absorber is inhibited.

If the LOW-TEMP. flag is not set at "1" and if the vehicle speed v is zero, an affirmative decision (YES) is obtained in step S44, whereby step S46 is implemented to apply a suitable drive signal to the stepping motor 40 for returning the stepping motor 40 to its zero point described above. Then, the control returns to step S41.

In the present embodiment, the control of the damping characteristic of each shock absorber is inhibited as described above, depending upon the appropriate one of the LOW-TEMP. flags corresponding to the four wheels of the vehicle. However, it is possible to inhibit the control of the damping characteristics of all the four shock absorbers if the LOW-TEMP. flag for any one of the four wheels is set at "1". It is also possible to inhibit the control of the damping characteristics of all the four wheels as needed, depending upon the averages of the actual and ideal acceleration values $\alpha_A$ and $\alpha_R$ associated with all the four wheels.

It will be understood from the foregoing explanation of the present first embodiment that the acceleration sensors 80 serve as means for detecting the acceleration of the sprung member, while the displacement sensors 82 serve as means for detecting the relative displacement of the sprung and unsprung members. It is also to be understood that a portion of the controller 60 assigned to execute the TEMPERATURE MONITORING routine constitutes means for estimating the oil temperature of the shock absorber, while a portion of the controller 60 assigned to implement steps S43, S44 and S46 of the flow chart of FIG. 6 constitutes means for placing an actuator in the form of the motor 40 in a predetermined position upon estimation or determination of the oil temperature of the shock absorber. Obviously, the controller 60 serves as a controller for controlling the motor 40 to control the damping characteristic of the shock absorber.

Referring next to FIGS. 10–14, there will be described a second embodiment of the present invention. In the interest of brevity and simplification, those parts of the second embodiment which are identical in substance with the corresponding parts of the first embodiment will be neither described nor shown in the drawings.

Figure 10:
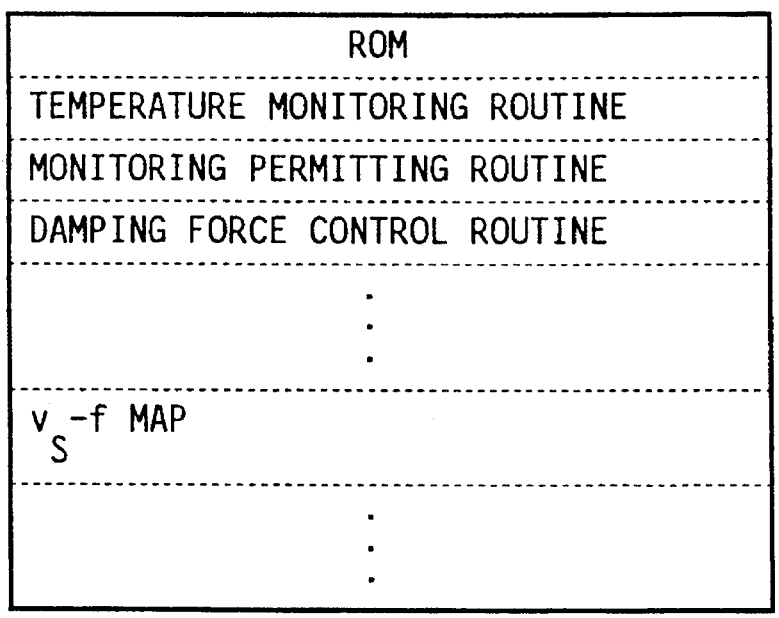
FIG. 10 is a view schematically showing an arrangement of a ROM 72 used in a second embodiment of the invention.
Figure 11:
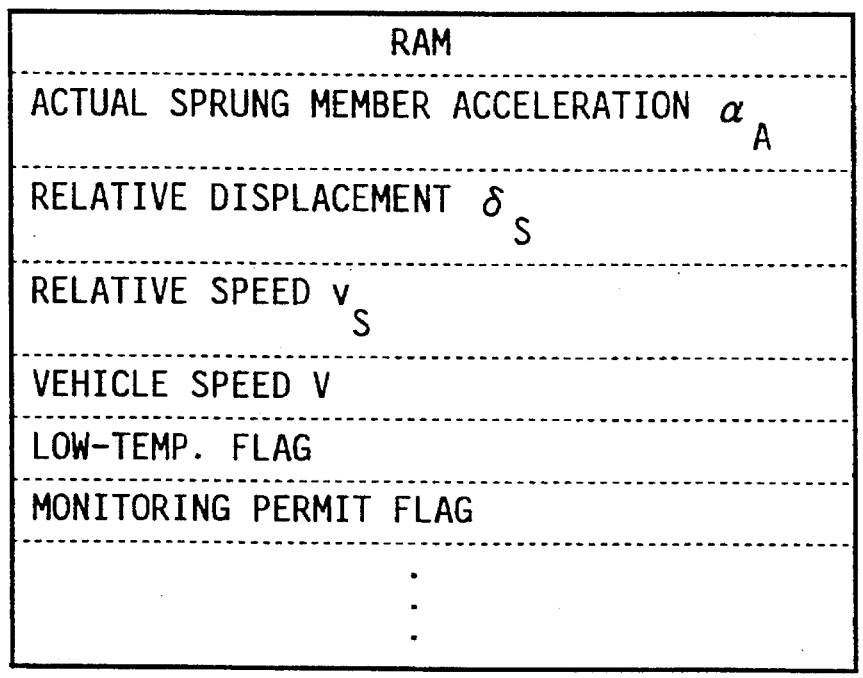
FIG. 11 is a view schematically showing an arrangement of a RAM 74 used in the second embodiment of FIG. 10.

In the present second embodiment, the ROM 72 stores various control programs such as a TEMPERATURE MONITORING routine, a MONITORING PERMITTING routine and a DAMPING FORCE CONTROL routine, and data maps such as the $v_S$-f relationship map, as indicated in FIG. 10. As shown in FIG. 11, the RAM 74 has a memory for storing a MONITORING PERMIT flag, in addition to the memories provided in the first embodiment.

First, the background of the present second embodiment will be described. When the vehicle body heavily vibrates in the vertical direction during running on a bumpy or washboard road surface, or when the vehicle receives a high-frequency vibration from the road surface, the outputs of the sensors, for example, the displacement sensors 82 include some error. Therefore, the monitoring or determination of the oil temperature of the shock absorbers regardless of the road surface condition (regardless of the frequency of the vibration received from the road surface) is not necessarily highly reliable. In view of this drawback, the second embodiment is adapted to determine whether the frequency of the vibration of the vehicle body received from the road surface is low or high, and permit the execution of the TEMPERATURE MONITORING routine only when the frequency of the vibration is relatively low, but inhibit the execution when the frequency is relatively high.

Figure 5:
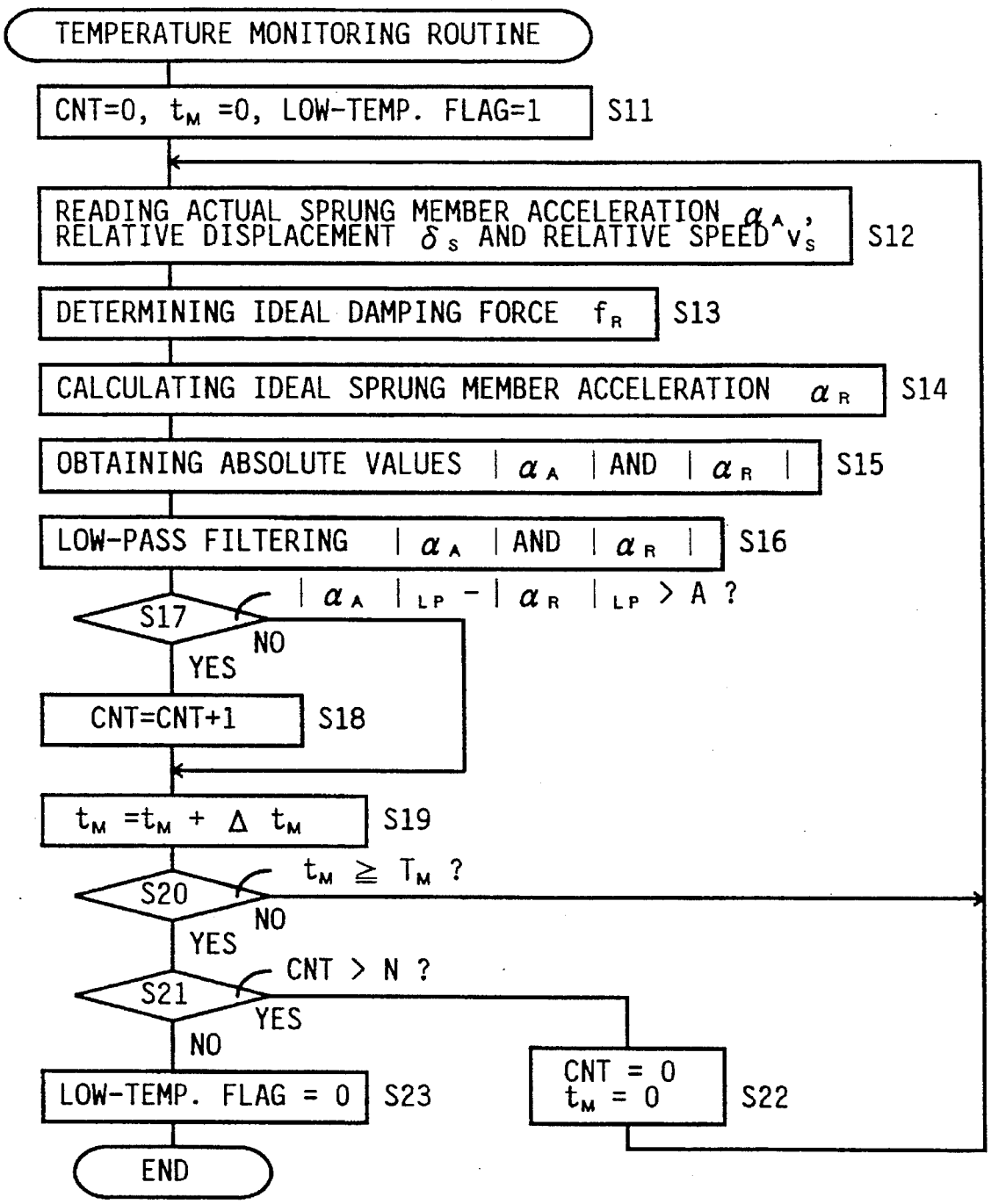
FIG. 5 is a flow chart illustrating a temperature monitoring routine stored in the ROM 72 of FIG. 3.
Figure 12:
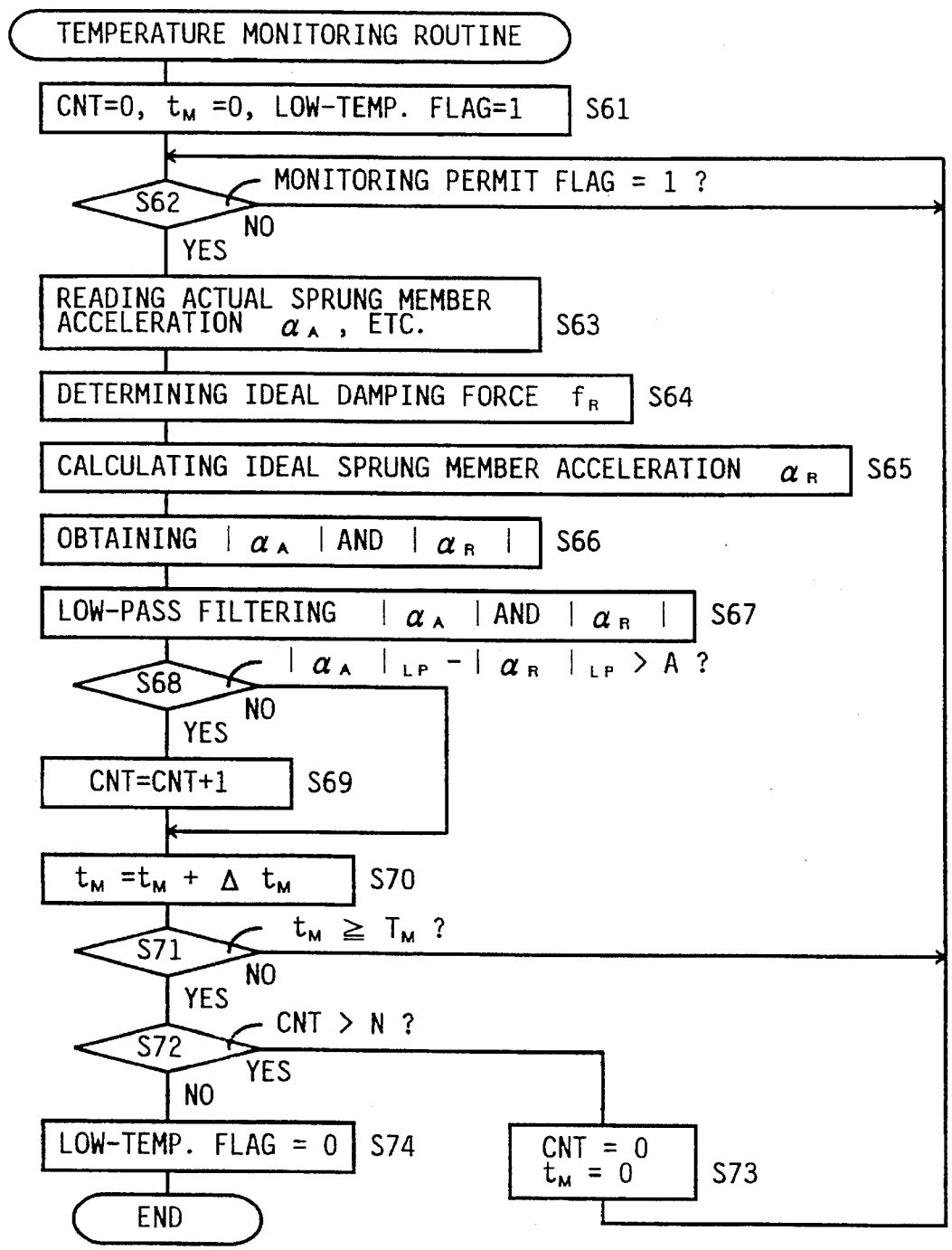
FIG. 12 is a flow chart illustrating a temperature monitoring routine used in the second embodiment.

The TEMPERATURE MONITORING routine is illustrated in the flow chart of FIG. 12, which is basically identical with that illustrated in FIG. 5. Only difference of the routine of FIG. 12 from that of FIG. 5 is the addition of step S62 to the routine of FIG. 12. This step S62 is provided to determine whether the MONITORING PERMIT flag stored in the RAM 74 is set at "1", that is, whether the execution of the TEMPERATURE MONITORING routine has been permitted in the MONITORING PERMITTING routine. If the MONITORING PERMIT flag is set at "1", an affirmative decision (YES) is obtained in step S62, and the control flow goes to step S63 and the subsequent steps to make the determination on the oil temperature of the shock absorber as in the routine of FIG. 5 used in the first embodiment. If the MONITORING PERMIT flag is not set at "1", however, a negative decision (NO) is obtained in step S62, and this step is repeatedly implemented, whereby the determination on the oil temperature is inhibited until the MONITORING PERMIT flat is changed to "1".

The MONITORING PERMITTING routine utilizes the acceleration sensor 80 for each vehicle wheel. The actual acceleration value $\alpha_A$ from the sensor 80 is used to determine whether the vibration of the vehicle body received from the road surface has a relatively low frequency or not. More specifically described, the output signal of the acceleration sensor 80 is subjected to low-pass filtering to extract a low-frequency component of the acceleration $\alpha_A$. If the intensity of the low-frequency component is greater than a threshold, it is determined that the intensity of the low-frequency component is greater than that of a high-frequency component of $\alpha$. In this case, it is determined that the vibration of the vehicle body has a relatively low frequency, and the execution of the TEMPERATURE MONITORING routine is permitted. That is, the MONITORING PERMIT flag is set to "1". If the intensity of the low-frequency component of $\alpha$ is smaller than the threshold, then the MONITORING PERMIT flag is set to "0" to inhibit the execution of the TEMPERATURE MONITORING routine.

The MONITORING PERMITTING routine will be described by reference to the flow chart of FIG. 13.

The present routine is commenced immediately after the ignition switch is turned on.

The routine is initiated with step S81 to determine whether the LOW-TEMP. flag stored in the RAM 74 is set at "0". In other words, the MONITORING PERMITTING routine is executed only while the oil temperature of the shock absorber is low. If an affirmative decision (YES) is obtained in step S81, the control flow goes to step S82 to reset the MONITORING PERMIT flag to "0", to inhibit the execution of the TEMPERATURE MONITORING routine of FIG. 12, in an initial period immediately after the ignition switch is turned on.

Then, the control flow goes to step S83 to read in the actual acceleration value $\alpha_A$ of the sprung member as detected by the sensor 80, and then to step S84 in which the signal representative of the actual acceleration value $\alpha_A$ is low-pass filtered to extract a low-frequency signal representative of a low-frequency component $\alpha_{AL}$ of $\alpha_A$. The cut-off frequency in the low-pass filtering may be in the neighborhood of 1 Hz, for example. Refer to dashed line in the graph of FIG. 14. Then, step S85 is implemented to obtain the absolute value $|\alpha_{AL}|$, which is then smoothed by low-pass filtering to obtain smoothed value $|\alpha_{AL}|_{LP}$ in step S86.

The control flow then goes to step S87 to determine whether the smoothed value $|\alpha_{AL}|_{LP}$ is larger than a positive threshold value "B", namely, to determine whether the frequency of the vibration of the vehicle body due to unevenness of the road surface is low. If an affirmative decision (YES) is obtained in step S87, step S88 is implemented to set the MONITORING PERMIT flag to "1", for permitting the execution of the TEMPERATURE MONITORING routine. If a negative decision (NO) is obtained in step S87, the control flow goes to step S89 to set the MONITORING PERMIT flag to "0" to inhibit the execution of the TEMPERATURE MONITORING routine. In either case, the control then returns to step S83.

Figure 6:
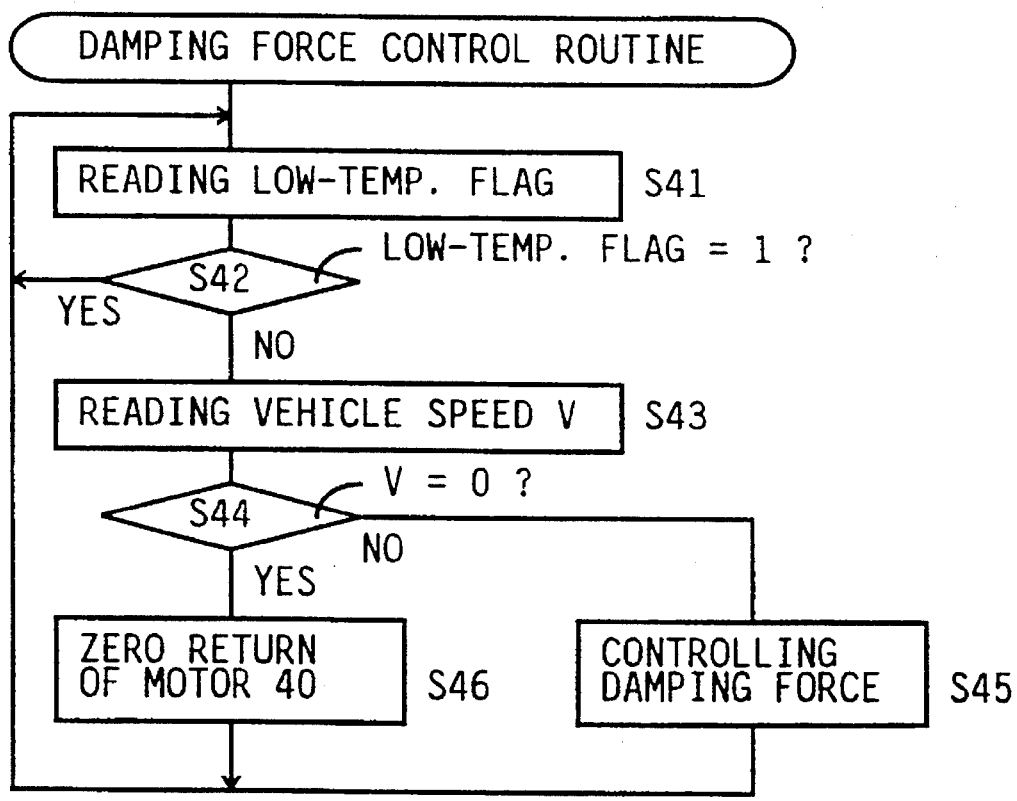
FIG. 6 is a flow chart illustrating a damping force control routine also stored in the ROM 72 of FIG. 3.

The DAMPING FORCE CONTROL routine in the present second embodiment is the same as illustrated in FIG. 6.

It is noted that the present second embodiment utilizes the acceleration sensor 80 to execute the MONITORING PERMITTING routine, and does not require an exclusive sensor to perform this additional function. Thus, the MONITORING PERMITTING routine does not cause an increase in the cost of the damping force control apparatus.

It will be understood from the above description of the second embodiment that the acceleration sensor 80 serves as means for detecting the acceleration of the sprung member, while the displacement sensor 82 serves as means for detecting the relative displacement of the sprung and unsprung members, and that a portion of the controller 60 assigned to execute the TEMPERATURE MONITORING routine constitutes means for estimating the oil temperature of the shock absorber, while a portion of the controller 60 assigned to execute the MONITORING PERMITTING routine constitutes means for determining whether the frequency of the vibration of the vehicle body received from the road surface is low. Further, a portion of the controller 60 assigned to implement step S62 of FIG. 12 and steps S88 and S89 of FIG. 13 constitutes means for permitting the operation of the oil temperature estimating means. It is also noted that a portion of the controller 60 assigned to implement steps S43, S44 and S46 of the flow chart of FIG. 6 constitutes means for placing the motor 40 in a predetermined position upon estimation or determination of the oil temperature of the shock absorber, and the controller 60 serves as a controller for controlling the motor 40 to regulate the damping characteristic of the shock absorber.

A third embodiment of the present invention will be described.

Figure 15:
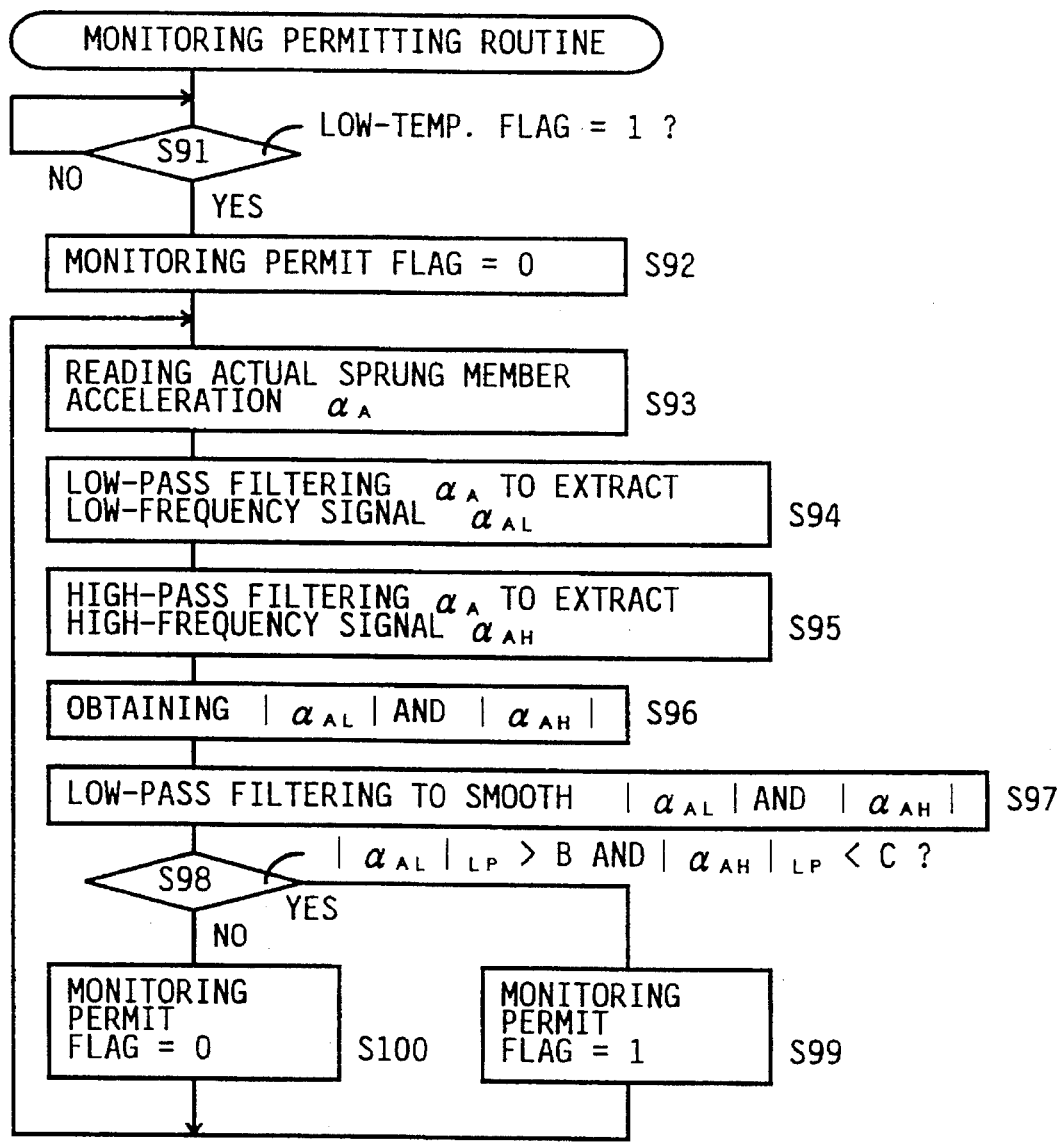
FIG. 15 is a flow chart illustrating a monitoring permitting routine used in a third embodiment of this invention.

This embodiment employs a MONITORING PERMITTING routine as illustrated in the flow chart of FIG. 15, as well as the TEMPERATURE MONITORING routine of FIG. 12 and the DAMPING FORCE CONTROL routine of FIG. 6.

Figure 13:
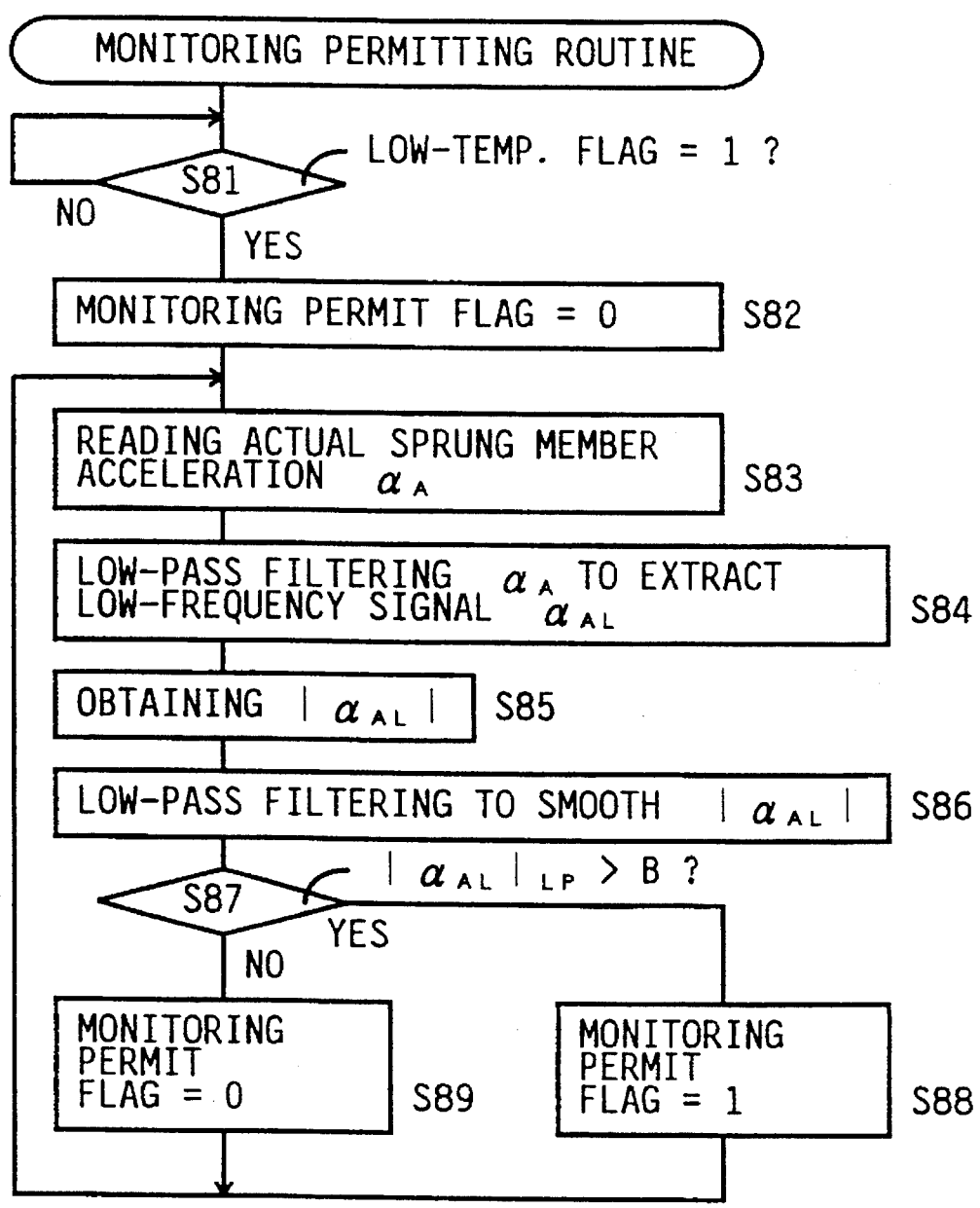
FIG. 13 is a flow chart illustrating a monitoring permitting routine used in the second embodiment.
Figure 14:
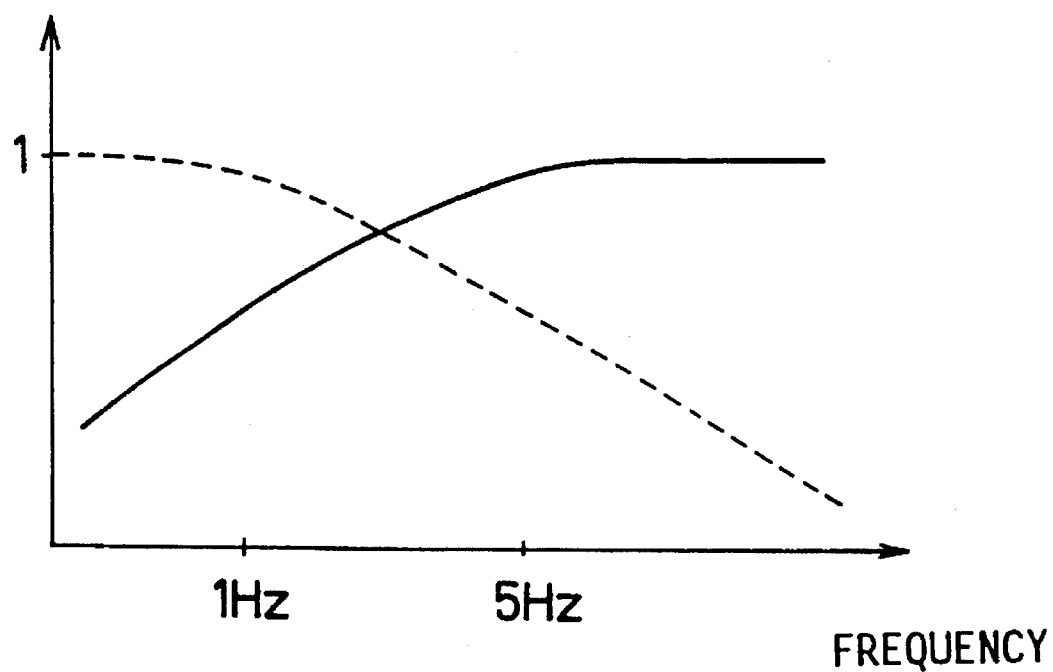
FIG. 14 is a graph for explaining characteristics of low-pass and high-pass filtering operations in the second embodiment.

The MONITORING PERMITTING routine of FIG. 15 is similar to that of FIG. 13 in that the low-frequency signal $\alpha_{AL}$ of the actual acceleration $\alpha_A$ is used to determine whether the vibration of the vehicle body has a relatively low frequency. However, the routine of FIG. 15 is different from that of FIG. 13 in that a high-frequency signal $\alpha_{AH}$ of the actual acceleration $\alpha_A$ is also used to effect the determination of the vibration frequency. That is, the routine of FIG. 15 is formulated to determine that the vibration frequency is low, if the intensity of the low-frequency signal $\alpha_{AL}$ is larger than the threshold "B" and if the intensity of the high-frequency signal $\alpha_{AH}$ is smaller than a threshold "C". In the other instances, the routine determines that the vibration frequency is high, and inhibit the execution of the TEMPERATURE MONITORING routine.

The MONITORING PERMITTING routine will be described in detail by reference to the flow chart of FIG. 15.

Steps S91–S94 of the present routine are identical with steps S81–S84 of the routine of FIG. 13. Step S94 is followed by step S95 to high-pass filter the actual acceleration value $\alpha_A$ to extract the high-frequency signal $\alpha_{AH}$. The cut-off frequency of the high-pass filter may be in the neighborhood of 5 Hz, for example. Refer to solid line in the graph of FIG. 14. Then, step S96 is implemented to obtain the absolute values $|\alpha_{AL}|$ and $|\alpha_{AH}|$, and step S97 is implemented to smooth the absolute values $|\alpha_{AL}|$ and $|\alpha_{AH}|$ by low-pass filtering, and thereby obtain smoothed values $|\alpha_{AL}|_{LP}$ and $|\alpha_{AH}|_{LP}$.

The control flow then goes to step S98 to determine whether the smoothed value $|\alpha_{AL}|_{LP}$ is larger than the threshold "B" and the smoothed value $|\alpha_{AH}|_{LP}$ is smaller than the threshold "C". If an affirmative decision (YES) is obtained in step S98, step S99 is implemented to set the MONITORING PERMIT flag to "1" namely, to determine that the vibration of the vehicle body received from the road surface has a relatively low frequency. Then, the control returns to step S93. If the value $|\alpha_{AL}|_{LP}$ is not larger than the threshold "B" or if the value $|\alpha_{AH}|_{LP}$ is not smaller than the threshold "C", a negative decision (NO) is obtained in step S98, and the control flow goes to step S100 to determine that the vibration frequency of the vehicle is relatively high, and set the MONITORING PERMIT flag to "0". Step S100 is followed by step S93.

In the present third embodiment, too, the acceleration sensor 80 serves as means for detecting the acceleration of the sprung member, while the displacement sensor 82 serves as means for detecting the relative displacement of the sprung and unsprung members, and that a portion of the controller 60 assigned to execute the TEMPERATURE MONITORING routine constitutes means for estimating the oil temperature of the shock absorber, while a portion of the controller 60 assigned to execute the MONITORING PERMITTING routine constitutes means for determining whether the frequency of the vibration of the vehicle body received from the road surface is low. Further, a portion of the controller 60 assigned to implement step S62 of FIG. 12 and steps S99 and S100 of FIG. 15 constitutes means for permitting the operation of the oil temperature estimating means. It is also noted that a portion of the controller 60 assigned to implement steps S43, S44 and S46 of the flow chart of FIG. 6 constitutes means for placing the motor 40 in a predetermined position upon estimation or determination of the oil temperature of the shock absorber, and the controller 60 serves as a controller for controlling the motor 40 to regulate the damping characteristic of the shock absorber.

A fourth embodiment of the present invention will be described.

Figure 16:
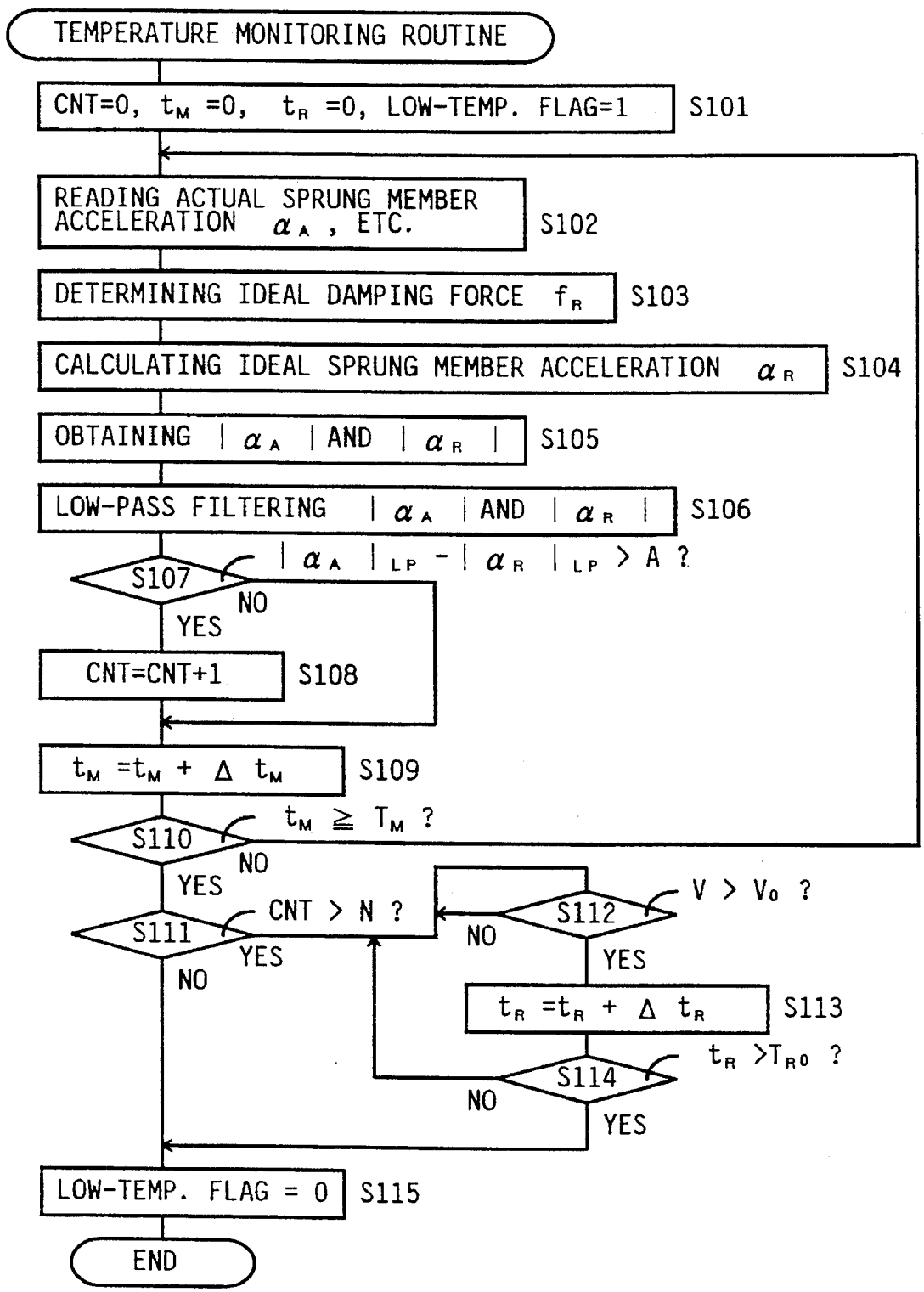
FIG. 16 is a flow chart illustrating a temperature monitoring routine used in a fourth embodiment of the invention.

The ROM 72 used in this embodiment stores control programs and data maps such as a TEMPERATURE MONITORING routine of FIG. 16 and the DAMPING FORCE CONTROL routine of FIG. 6, but does not store a MONITORING PERMITTING routine as used in the preceding embodiments.

Figure 17:
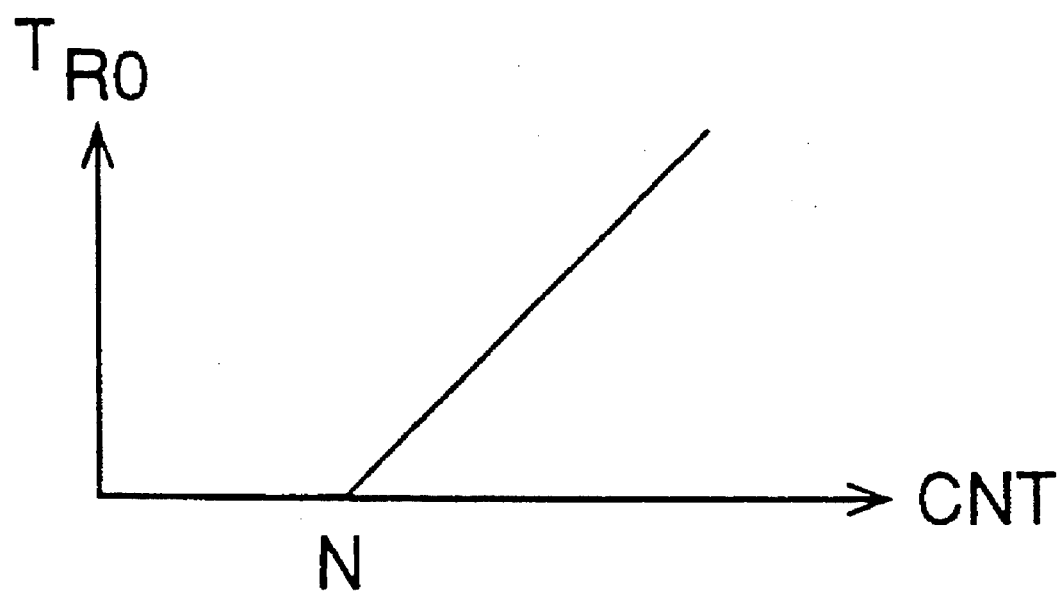
FIG. 17 is a graph for explaining a threshold value $T_{RO}$ which changes with the content of a counter CNT in the temperature monitoring routine of FIG. 16.

The TEMPERATURE MONITORING routine illustrated in FIG. 16 is basically identical with that of FIG. 12, except for the procedure taken after the oil temperature of the shock absorber is determined to be low for the first time. In the routine of FIG. 12, steps S62–S73 are repeatedly implemented until the negative decision (NO) is obtained in step S72, that is, until the oil temperature is determined to be high. In the routine of FIG. 16 of the present fourth embodiment, steps other than the steps used to determine the low temperature of the oil for the first time are implemented to determine whether the oil temperature has been raised above the lower limit of the high or optimum range. Described in detail, the present routine is based on the fact that the oil temperature will rise due to friction of the oil flowing in the shock absorber and friction of the slidably engaging members as a running time of the vehicle after the start passes. The routine is adapted to determine that the oil temperature is high, if a predetermined condition that would raise the oil temperature above the lower limit of the optimum range is established and detected after the oil temperature is determined to be low for the first time. The routine includes steps for detecting the presence of the predetermined condition, and determining a rise of the oil temperature into the optimum range when the predetermined condition is detected. In the present embodiment, the predetermined condition is established when a measured time $t_R$ of a vehicle run at a speed V higher than a lower limit $V_0$ exceeds a predetermined threshold $T_{RO}$. A vehicle run at the speed V higher than $V_0$ for a time duration longer than $T_{RO}$ is considered to cause a rise of the oil temperature above the lower limit of the optimum or high range. The threshold $T_{RO}$ is not a fixed constant, but is a variable. As indicated in FIG. 17, the threshold $T_{RO}$ increases with a difference (CNT–N), where CNT represents the current count of the counter CNT while N represents the threshold with which the counter is compared. A significance of the variable threshold $T_{RO}$ is such that the larger the current count of the counter CNT, the larger a difference of the actual oil temperature from the optimum level, which difference corresponds to the vehicle running time $t_R$ required for the actual oil temperature to rise to the optimum level (lower limit of the optimum range).

The TEMPERATURE MONITORING routine used in the fourth embodiment will be described by reference to the flow chart of FIG. 16.

The routine is initiated with step S101 in which the counter CNT, time $t_M$ and vehicle running time $t_R$ are reset to "0", while the LOW-TEMP. flag is set to "1". Then, steps S102–S111 corresponding to steps S12–S21 of FIG. 5 are implemented to compare the actual acceleration value $\alpha_A$ with the ideal acceleration value $\alpha_R$. If the current count of the counter CNT is not larger than the threshold "N", a negative decision (NO) is obtained in step S111, and step S115 is implemented to reset the LOW-TEMP. flag to "0", that is, to determine that the oil temperature is not low. In this case, the routine is terminated, and will not be executed during the present run of the vehicle.

If the count of the counter CNT is larger than the threshold "N", an affirmative decision (YES) is obtained in step S111, that is, the oil temperature is determined to be still low. In this case, the control flow goes to step S112 to determine whether the current vehicle speed V is higher than a threshold $V_0$. If the vehicle speed V is higher than the threshold $V_0$, step S112 is followed by step S113 in which the time $t_R$ is incremented by a predetermined increment $\Delta t_R$. Then, step S114 is implemented to determine whether the time $t_R$ exceeds the threshold $T_{RO}$. The time $t_R$ exceeding the threshold $T_{RO}$ means that the oil temperature should have been raised to the lower limit of the optimum range. Therefore, if an affirmative decision (YES) is obtained in step S114, the control flow goes to step S115 to reset the LOW-TEMP. flag to "0". If the cumulative vehicle running time $t_R$ is shorter than the threshold $T_{RO}$, a negative decision (NO) is obtained in step S114, and the control returns to step S112. If the vehicle speed V is not higher than the threshold $V_0$, step S112 is repeatedly implemented until the vehicle speed V exceeds the threshold $V_0$.

In the present fourth embodiment, too, the acceleration sensor 80 serves as means for detecting the acceleration of the sprung member, while the displacement sensor 82 serves as means for detecting the relative displacement of the sprung and unsprung members, and that a portion of the controller 60 assigned to execute the TEMPERATURE MONITORING routine of FIG. 16 constitutes means for estimating the oil temperature of the shock absorber, while a portion of the controller 60 assigned to implement S43, S44 and S46 of the flow chart of FIG. 6 constitutes means for placing the motor 40 in a predetermined position upon estimation or determination of the oil temperature of the shock absorber. Further, a portion of the controller 60 assigned to implement step S114 of the flow chart of FIG. 16 constitutes means for changing the threshold value $T_{RO}$ used to monitor the vehicle running time $t_R$, depending upon the difference (CNT–N). The controller 60 serves as a controller for controlling the motor 40 to regulate the damping characteristic of the shock absorber. There will be described a fifth embodiment of the present invention, which uses a TEMPERATURE MONITORING routine illustrated in FIG. 18 and the DAMPING FORCE control routine of FIG. 6.

Figure 18:
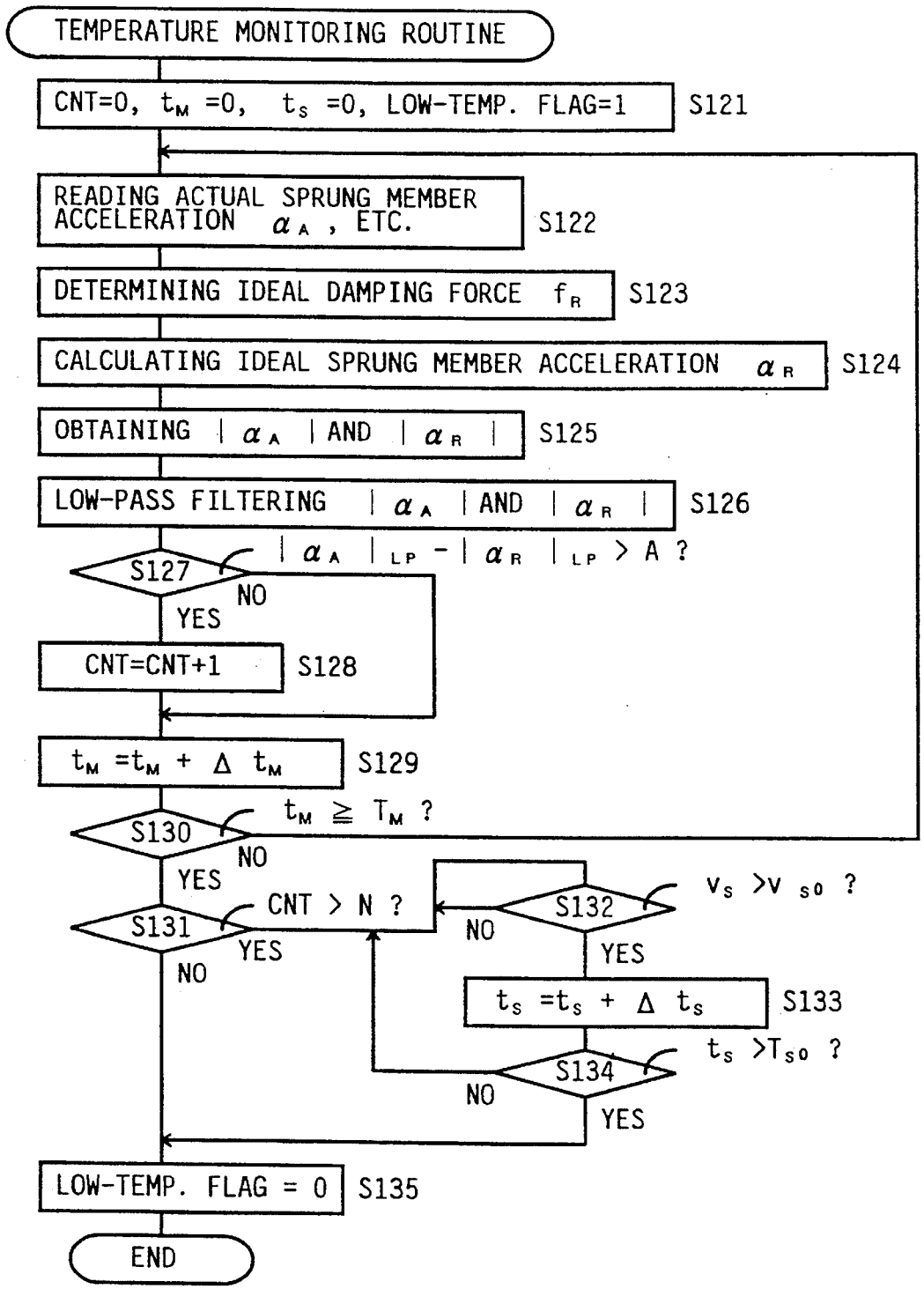
FIG. 18 is a flow chart illustrating a temperature monitoring routine used in a fifth embodiment of the present invention.

Like the routine of FIG. 16, the TEMPERATURE MONITORING routine of FIG. 18 includes steps for monitoring the oil temperature after the oil temperature is determined to be low for the first time. However, the parameters used for these monitoring steps are different from those used in the routine of FIG. 16. In particular, the vehicle running time $t_R$ is used in the routine of FIG. 16 as a parameter that reflects a rise of the oil temperature. In the present embodiment, however, a displacement time $t_S$ of the piston 20 of the shock absorber is used as the parameter. The displacement time $t_S$ is a length of time during which the piston 20 (i.e., sprung member) is being displaced at a relatively high rate.

The TEMPERATURE MONITORING routine will be described by reference to the flow chart of FIG. 18.

Figure 19:
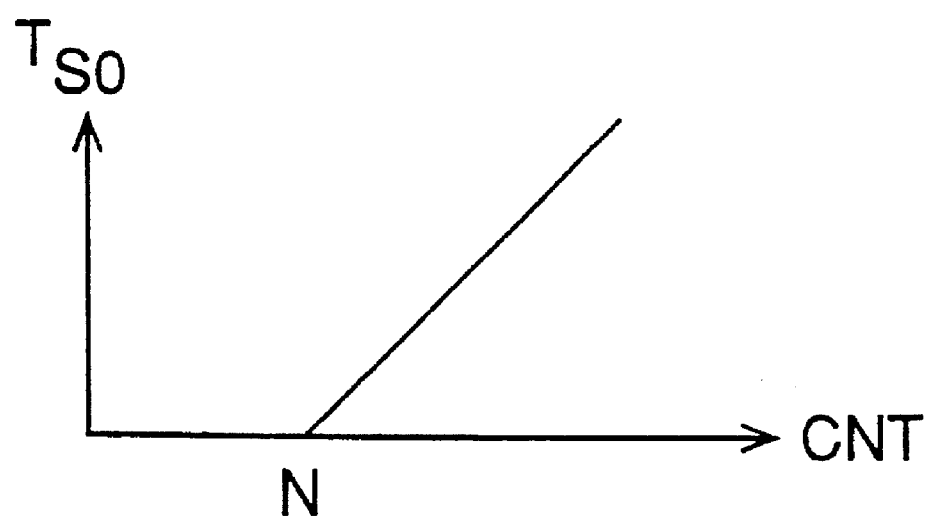
FIG. 19 is a graph for explaining a threshold value $T_{SO}$ which changes with the content of the counter CNT in the routine of FIG. 18.

Steps S121–S131 are identical with steps S101–S111 of FIG. 16. If an affirmative decision (YES) is obtained in step S131, step S132 is implemented to read out from the RAM 74 the relative speed $v_s$ of the sprung member, and determine whether the absolute value of the relative speed $v_S$ is larger than a threshold $v_{S0}$. If an affirmative decision (YES) is obtained in step S132, the control flow goes to step S133 to increment the displacement time $t_S$ by a predetermined increment $\Delta t_S$. Step S133 is followed by step S134 to determine whether the displacement time $t_S$ exceeds a threshold $T_{S0}$. Like the threshold $T_{R0}$ used in the routine of FIG. 16, the threshold TS0 is a function of the difference (CNT–N), as indicated in FIG. 19. If an affirmative decision (YES) is obtained in step s134, this means that the oil temperature has been raised to the lower limit of the optimum range. In this case, the control flow goes to step S135 to reset the LOW-TEMP. flag to "0". If the displacement time $t_s$ is shorter than the threshold $T_{S0}$, a negative decision (NO) is obtained in step S134, and the control returns to step S132. If the relative speed $v_S$ is lower than the threshold $v_{S0}$, step S132 is repeatedly implemented until the relative speed $v_S$ exceeds the threshold $v_{S0}$.

In the present fifth embodiment, too, the acceleration sensor 80 serves as means for detecting the acceleration of the sprung member, while the displacement sensor 82 serves as means for detecting the relative displacement of the sprung and unsprung members, and that a portion of the controller 60 assigned to execute the TEMPERATURE MONITORING routine of FIG. 18 constitutes means for estimating the oil temperature of the shock absorber, while a portion of the controller 60 assigned to implement S43, S44 and S46 of the flow chart of FIG. 6 constitutes means for placing the motor 40 in a predetermined position upon estimation or determination of the oil temperature of the shock absorber. Further, a portion of the controller 60 assigned to implement step S134 of the flow chart of FIG. 18 constitutes means for changing the threshold value $T_{S0}$ used to monitor the time $t_S$, depending upon the difference (CNT–N). The controller 60 serves as a controller for controlling the motor 40 to regulate the damping characteristic of the shock absorber.

Figure 20:
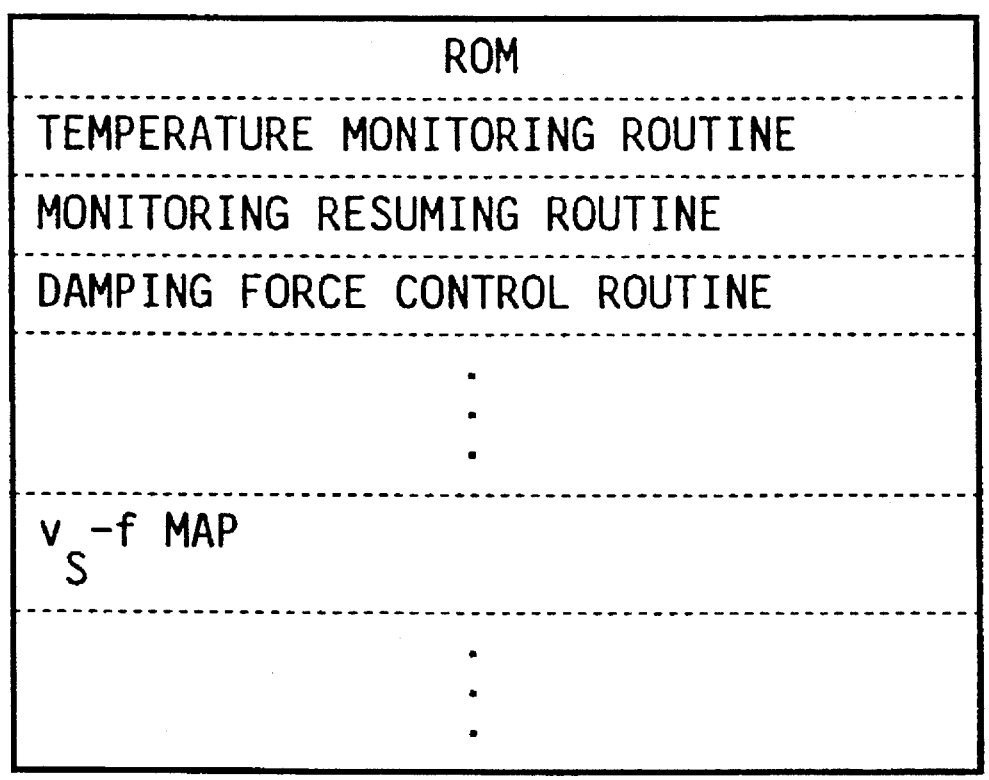
FIG. 20 is a view schematically illustrating an arrangement of a ROM 72 used in a sixth embodiment of this invention.
Figure 21:
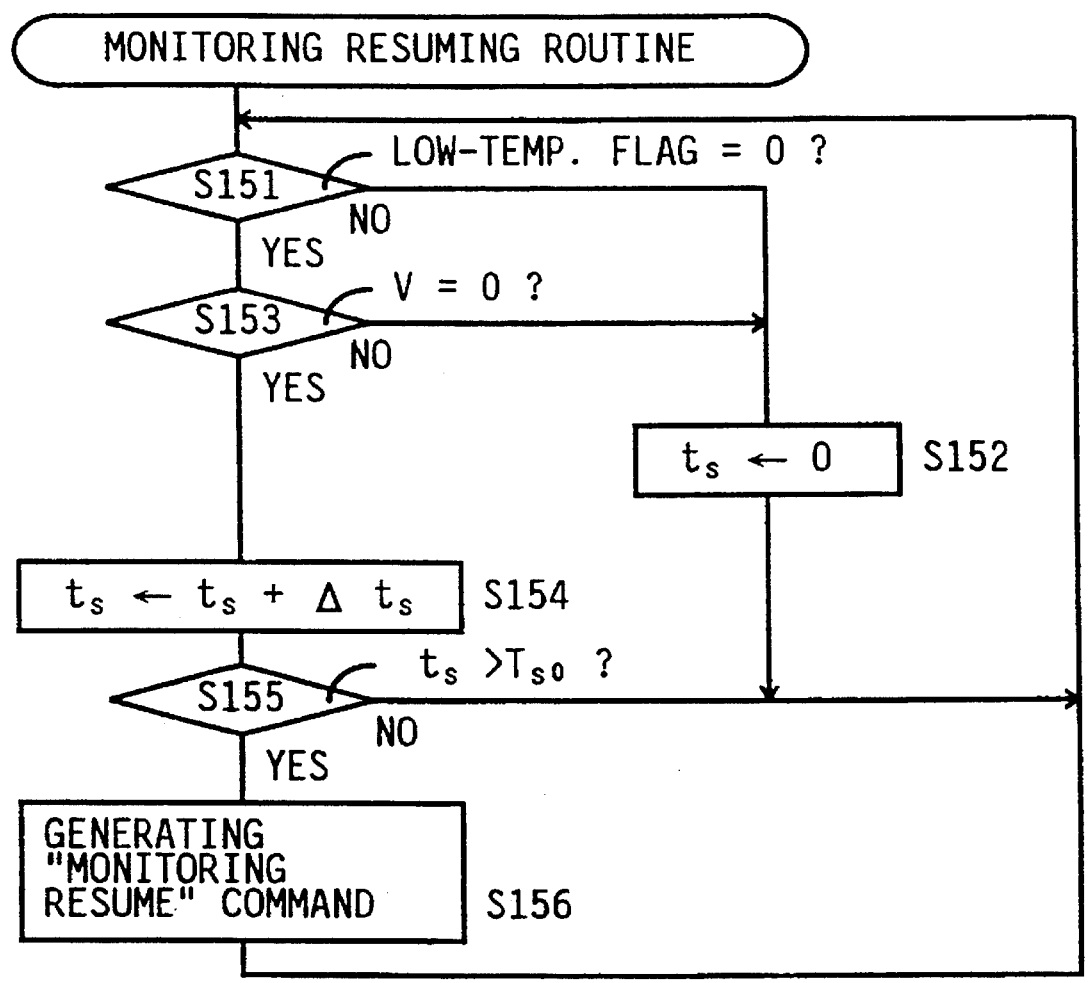
FIG. 21 is a flow chart illustrating a monitoring resuming routine provided in the embodiment of FIG. 20.

A sixth embodiment of this invention will be described referring to FIGS. 20 and 21. As shown in FIG. 20, the ROM 72 used in this embodiment stores control programs and data maps such as the TEMPERATURE MONITORING routine of FIG. 5, the DAMPING FORCE CONTROL routine of FIG. 6, and a MONITORING RESUMING routine illustrated in FIG. 21. No redundant description of the TEMPERATURE MONITORING and DAMPING FORCE CONTROL routines will be provided, and only the MONITORING RESUMING routine will be described.

The preceding embodiments are all based on an assumption that once the oil temperature of the shock absorber is determined to be high, the temperature would not be lowered below the lower limit of the optimum range. Actually, however, the oil temperature once raised may be lowered from the optimum range, for instance, if the vehicle is held stopped for a long time after the start of the engine, at a considerably low ambient temperature. It is therefore desirable to determine whether there is a high possibility that the oil temperature is lowered after it is raised to a level within the optimum range, and resume the temperature monitoring if the possibility is determined to be high. In the present embodiment, a continuous stop time $t_s$ of the vehicle after the oil temperature is determined to be high is measured, and the measured stop time $t_S$ is compared with a threshold $T_{S0}$. If the measured stop time $t_S$ exceeds the threshold $T_{S0}$, it is determined that there is a high possibility of the oil temperature being lowered, and the TEMPERATURE MONITORING routine is resumed.

The MONITORING RESUMING routine is provided to achieve the purpose indicated above. This routine will be described by reference to the flow chart of FIG. 21.

The routine is initiated with step S151 to determine whether the LOW-TEMP. flag is set at "0". Since the flag was initially set at "1" in step S11 of the TEMPERATURE MONITORING routine of FIG. 5, a negative decision (NO) is obtained in step S151 in the first cycle of execution of the routine of FIG. 21. Consequently, step S152 is implemented to reset the vehicle stop time $t_S$ to "0". Then, the control returns to step S151.

If the LOW-TEMP. flag is set to "0" while steps S151 and S152 are repeatedly implemented, the control flow goes to step S153 to determine whether the vehicle speed V is zero. If the vehicle speed V is not zero, step S152 is implemented to reset the vehicle stop time $t_S$. If the vehicle speed V is zero, step S153 is followed by step S154 to increment the vehicle stop time $t_S$ by a predetermined increment $\Delta t_S$. Step S154 is followed by step S155 to determine whether the vehicle stop time $t_s$ exceeds the threshold $T_{S0}$.

A negative decision (NO) is obtained in step S155, and steps S151–S155 are repeatedly implemented until the vehicle stop time $t_s$ exceeds the threshold $T_{S0}$. If the time $t_S$ exceeds the threshold $T_{S0}$, step S156 is implemented to generate a MONITORING RESUME command, which triggers the TEMPERATURE MONITORING routine to be resumed.

In the present sixth embodiment, too, the acceleration sensor 80 serves as means for detecting the acceleration of the sprung member, while the displacement sensor 82 serves as means for detecting the relative displacement of the sprung and unsprung members, and that a portion of the controller 60 assigned to execute the TEMPERATURE MONITORING routine of FIG. 5 constitutes means for estimating the oil temperature of the shock absorber, while a portion of the controller 60 assigned to implement S43, S44 and S46 of the flow chart of FIG. 6 constitutes means for placing the motor 40 in a predetermined position upon estimation or determination of the oil temperature of the shock absorber. Further, the controller 60 serves as a controller for controlling the motor 40 to regulate the damping characteristic of the shock absorber.

A seventh embodiment of the invention will be described. This embodiment uses the TEMPERATURE MONITORING routine of FIG. 5 and a DAMPING FORCE CONTROL routine of FIG. 22.

The preceding embodiments are all adapted to activate the stepping motor 40 to control the damping characteristic of the shock absorber as soon as the following conditions have been satisfied: The oil temperature has been determined to be high (the LOW-TEMP. flag has been reset to "0"); and the vehicle speed V has been determined not to be zero. However, the stepping motor 40 may be out of synchronism, if the stepping motor 40 is activated in the normal fashion to control the damping characteristic of the shock absorber, as soon as the LOW-TEMP. flag has been reset to "0". Even though the oil temperature within the cylinder chambers has been sufficiently raised, there is some risk of synchronism loss of the stepping motor 40 because of an increase of a load acting on the motor 40 in an initial period of control of the damping characteristic of the shock absorber, which increase may arise from an insufficient degree of run-in of the spool 32 with respect to the sliding surface, and/or an insufficient amount of reduction of the resistance of the oil in the rotor chamber, to the rotation of the rotor 42, due to a delay of the oil temperature rise in the rotor chamber as compared with the oil temperature rise in the cylinder chambers. In view of this possibility, the present seventh embodiment is arranged to perform a preliminary operation of the stepping motor 40 after the LOW-TEMP. flag has been reset to "0" and before the motor 40 is normally operated to control the damping characteristic of the shock absorber.

The preliminary operation of the motor 40 is continued for a predetermined length of time, or until the motor 40 has been operated a predetermined number of steps. To assure a satisfactory result of the preliminary operation, it is desirable that preliminary drive pulses be applied to the motor 40 at a frequency lower than the nominal frequency at which the motor 40 is normally operated. In this case, the motor 40 generates a considerably larger drive torque than in the normal operation.

Figure 22:
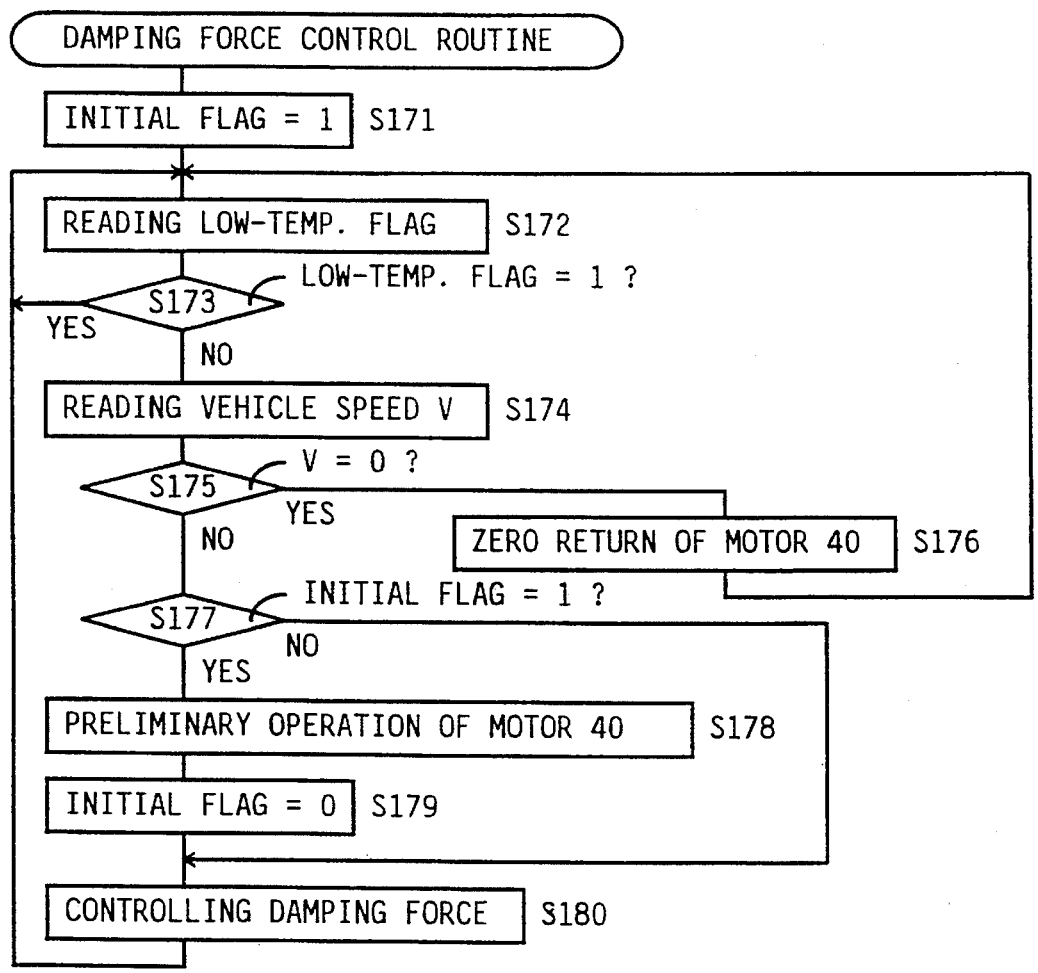
FIG. 22 is a flow chart illustrating a damping force control routine used in a seventh embodiment of this invention.

The DAMPING FORCE CONTROL routine used in the seventh embodiment will be described by reference to the flow chart of FIG. 22.

The routine is initiated with step S171 to set an INITIAL flag in the RAM 74 to "1". The function of this flag will become apparent from the following description. Then, step S172 is implemented to read the LOW-TEMP. flag stored in the RAM 74. Step S172 is followed by step S173 to determine whether the LOW-TEMP. flag is set at "1". As long as the LOW-TEMP. flag is set at "1", steps S172 and S173 are repeatedly implemented. When the LOW-TEMP. flag is reset to "0", then the control flow goes to step S174 to read the vehicle speed V stored in the RAM 74, and to step S175 to determine whether the vehicle speed V is zero. If the vehicle speed V is zero, step S176 is implemented to return the stepping motor 40 to its zero point, and the control returns to step S172. If the vehicle speed V is not zero, step S175 is followed by step S177 to determine whether the INITIAL flag is set at "1". Since the INITIAL flag was set to "1" in step S171, an affirmative decision (YES) is obtained in step S177 in the first cycle of execution of the present routine after the ignition switch of the vehicle is turned on. In the first cycle of execution of the routine, therefore, step S178 is implemented to perform the preliminary operation of the stepping motor 40 in which the motor 40 is operated a predetermined number of steps with drive pulses applied thereto at a lower frequency than in the normal operation performed in step S180 which will be described. The application of the drive pulses at the relatively low frequency means a relatively long time of voltage application to the motor 40 in each energization cycle, and assures a relatively large drive force or torque in the preliminary operation, than in the normal operation of the actuator. Consequently, the spool 32 is reciprocated successively a predetermined number of times at a lower speed than in the normal operation. The reciprocating stroke of the spool 32 is between its positions for fully opening and fully closing the passage 26. That is, the preliminary operation of the stepping motor 40 causes two or more consecutive reciprocations of the spool 32 between its stroke ends. As a result, the spool 32 sufficiently runs in with the sliding surface, and the oil temperature within the rotor chamber of the rotor 42 rises owing to flows of the oil between the rotor cheer and the cylinder cheers of the shock absorber, whereby the load acting on the motor 40 is accordingly reduced.

Then, the control flow goes to step S179 to reset the INITIAL flag to "0", and step S180 in which the stepping motor 40 is normally operated so as to control the damping force of the shock absorber.

In the present seventh embodiment, too, the acceleration sensor 80 serves as means for detecting the acceleration of the sprung member, while the displacement sensor 82 serves as means for detecting the relative displacement of the sprung and unsprung members, and that a portion of the controller 60 assigned to execute the TEMPERATURE MONITORING routine of FIG. 5 constitutes means for estimating the oil temperature of the shock absorber. Further, a portion of the controller 60 assigned to implement steps S174–S176 of the flow chart of FIG. 22 constitutes means for placing the motor 40 in a predetermined position upon estimation or determination of the oil temperature of the shock absorber. It is also noted that a portion of the controller 60 assigned to implement steps S177 and S178 constitutes means for performing a preliminary operation of the motor 40, and that the controller 60 serves as a controller for controlling the motor 40 to regulate the damping characteristic of the shock absorber.

There will next be described an eighth embodiment of the present embodiment, which uses a TEMPERATURE MONITORING routine as illustrated in the flow chart of FIG. 23, and a DAMPING FORCE CONTROL routine as illustrated in the flow chart of FIG. 24.

In all of the preceding embodiments, the temperature monitoring is effected to determine whether the oil temperature is either in the low range or in the high or optimum range. The TEMPERATURE MONITORING routine used in the present eighth embodiment is formulated to classify the estimated oil temperature into one of three ranges: very low range; low range; and high range. The DAMPING FORCE CONTROL routine is adapted so as to inhibit the operation of the stepping motor 40, and prevent out-of-synchronism of the motor, when the oil temperature is determined to be in the very low range, and permit the operation of the motor 40 to control the damping force of the shock absorber when the oil temperature is determined to be in the low or high range. When the oil temperature is in the high range, the motor 40 is operated in the normal fashion with drive pulses applied thereto at the nominal frequency. When the oil temperature is in the low range, the drive pulses are applied to the motor 40 at a frequency lower than the nominal frequency, in order to prevent the synchronism loss of the motor 40.

The TEMPERATURE MONITORING routine and the DAMPING FORCE CONTROL routine will be described in detail referring to the flow charts of FIGS. 23 and 24, respectively. The TEMPERATURE MONITORING routine of FIG. 23 is basically similar to that of FIG. 5. The routine is initiated with step S301 to reset the time $t_M$, and cumulative actual acceleration $\Sigma_A$ and cumulative ideal acceleration $\Sigma_R$ of the sprung member to "0", set a VERY-LOW-TEMP. flag to "1", and a LOW-TEMP. flag to "0". It will be understood that the oil temperature upon initiation of the routine is assumed to be in the very low range, in order to prevent synchronism loss of the motor 40 immediately after the ignition switch is turned on.

Step S301 is followed by steps S302–S306 which are identical with steps S12–S16 of FIG. 5. Then, the control flow goes to step S307 to determine whether the time $t_M$ exceeds the predetermined sampling period $T_M$. If a negative decision (NO) is obtained in step S307, step S308 is implemented to increment the time $t_M$ by a predetermined increment $\Delta t_M$, and step S309 is then implemented to add the smoothed actual acceleration value $|\alpha_A|_{LP}$ to the cumulative actual acceleration value $\Sigma_A$, and to add the smoothed ideal acceleration value $|\alpha_A|_{LP}$ to the cumulative ideal acceleration value $\Sigma_R$. Then, the control returns to step S302.

When the time $t_M$ exceeds the sampling period $T_M$ during repeated implementation of steps S302–S309, an affirmative decision (YES) is obtained in step S307, and the control flow goes to step S310 to obtain a product $\Sigma_A \cdot \Delta t_M$ and divide this product by the sampling period $T_M$ to thereby obtain an average actual acceleration value $M_A$ of the sprung member. In step S310, an average ideal acceleration value $M_R$ of the sprung member is also calculated, by dividing a $\Sigma_R \cdot \Delta t_M$ product by $T_M$.

Step S310 is followed by step S311 to determine whether a difference $(M_A - M_R)$ is larger than a threshold "F". If an affirmative decision (YES) is obtained in step S311, this means that the oil temperature is in the very low range. In this case, the control flow goes to step S312 to reset the time $t_M$ and the cumulative actual and ideal acceleration values $\Sigma_A$ and $\Sigma_R$ to "0", and then returns to step S302. In this condition, the VERY-LOW-TEMP. flag is held at "1" while the LOW-TEMP. flag is held at "0".

If a negative decision (NO) is obtained in step S311, step S313 is implemented to determine whether the difference $(M_A - M_R)$ is larger than a threshold "G", which is smaller than the threshold "F". If an affirmative decision (YES) is obtained in step S313, this means that the oil temperature is in the low range. In this case, the control flow goes to step S314 to reset the very-LOW-TEMP. flag to "0", and to step S315 to set the LOW-TEMP. flag to "1".

Steps S314 and S315 are followed by step S316 to determine whether the oil temperature has been raised into the high range. If an affirmative decision (YES) is obtained in step S316, step S317 is implemented to reset also the LOW-TEMP. flag to "0".

If the difference $(M_A - M_R)$ is smaller than the threshold "F" and is smaller than the threshold "G", an negative decision (NO) is obtained in step S313 as well as in step S311. In this case, it is determined that the oil temperature is in the high range, and step S318 is implemented to reset the VERY-LOW-TEMP. flag to "0". Since the LOW-TEMP. flag is now set at "0", both of the LOW-TEMP. flag and the VERY-LOW-TEMP. flag are set at "0".

Figure 24:
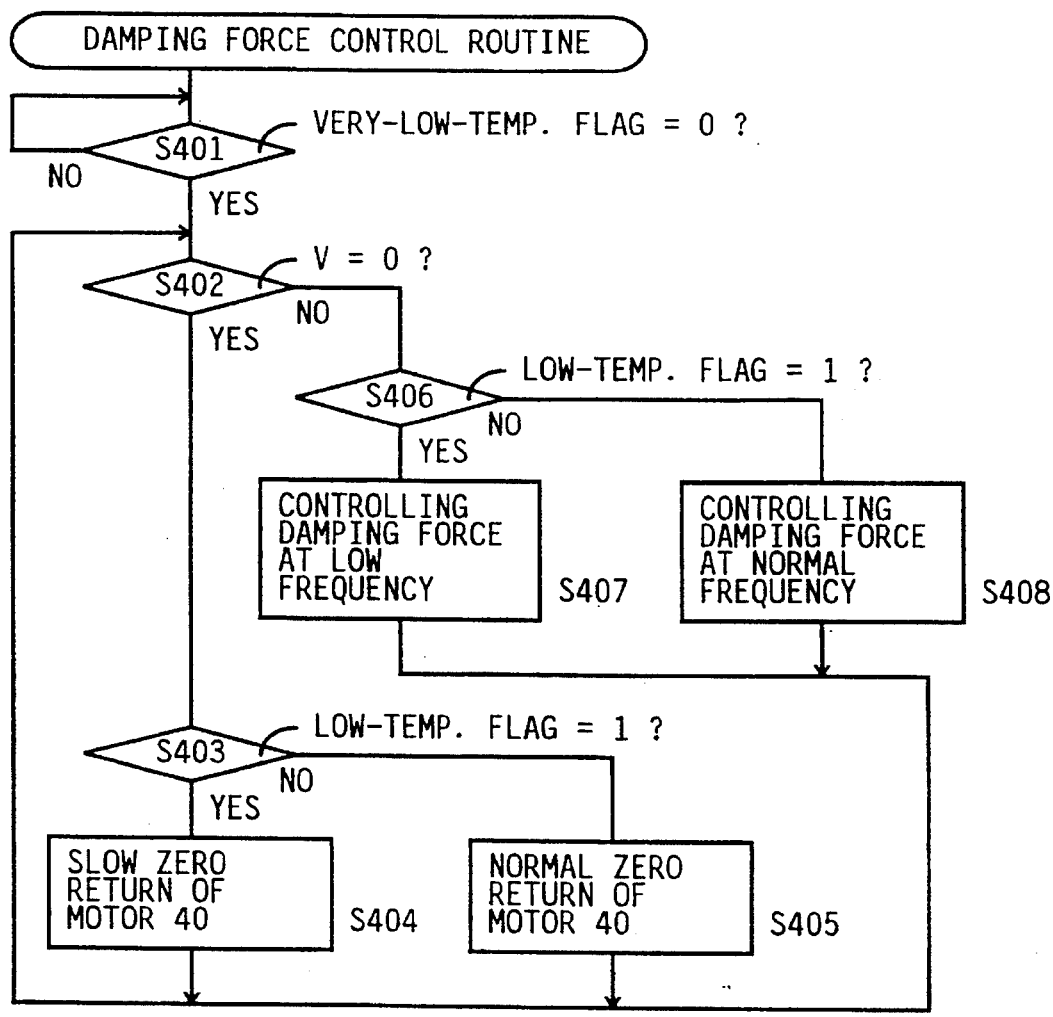
FIG. 24 is a flow chart illustrating a damping force control routine used in the eighth embodiment of the invention.

The DAMPING FORCE CONTROL routine of FIG. 24 is initiated with step S401 to determine whether the VERY-LOW-TEMP. flag is set at "0". Step S401 is repeatedly implemented and the following steps will not be implemented, until the VERY-LOW-TEMP. flag is reset to "0". Thus, the control of the damping force of the shock absorber is inhibited as long as the oil temperature is determined to be in the very low range.

When the VERY-LOW-TEMP. flag is reset to "0", an affirmative decision (YES) is obtained in step S401, and the control flow goes to step S402 to determine whether the vehicle speed V is zero. If an affirmative decision (YES) is obtained in step S402, step S403 is implemented to determine whether the LOW-TEMP. flag is set at "1", namely, determine whether the oil temperature is in the low range. If an affirmative decision (YES) is obtained in step S403, step S404 is implemented to return the stepping motor 40 at a relatively low speed. If a negative decision (NO) is obtained in step S403, that is, if the oil temperature is in the high range, step S405 is implemented to return the motor 40 at a relatively high speed, namely, at the nominal speed. In either case, the control returns to step S402.

If the vehicle speed V is not zero, a negative decision (NO) is obtained in step S402, and the control flow goes to step S406 to determine whether the LOW-TEMP. flag is set at "1". If an affirmative decision (YES) is obtained in step S406, that is, if the estimated oil temperature is relatively low, step S407 is implemented to operate the stepping motor 40 at a comparatively low speed to control the damping characteristic of the shock absorber. In this step S407, drive pulses are applied to the motor 40 at a frequency lower than the nominal frequency at which the drive pulses are applied to the motor 40 in step S408 described below. The application of the drive pulses at the relatively low frequency means a relatively long time of voltage application to the motor 40, and assures a relatively large torque of the motor. If a negative decision (NO) is obtained in step S406, that is, if the estimated oil temperature is relatively high, step S408 is implemented to operate the motor 40 at the nominal speed to control the damping characteristic of the shock absorber. In this step S408, drive pulses are applied to the motor 40 at the nominal frequency. In either case, the control returns to step S402.

Figure 23:
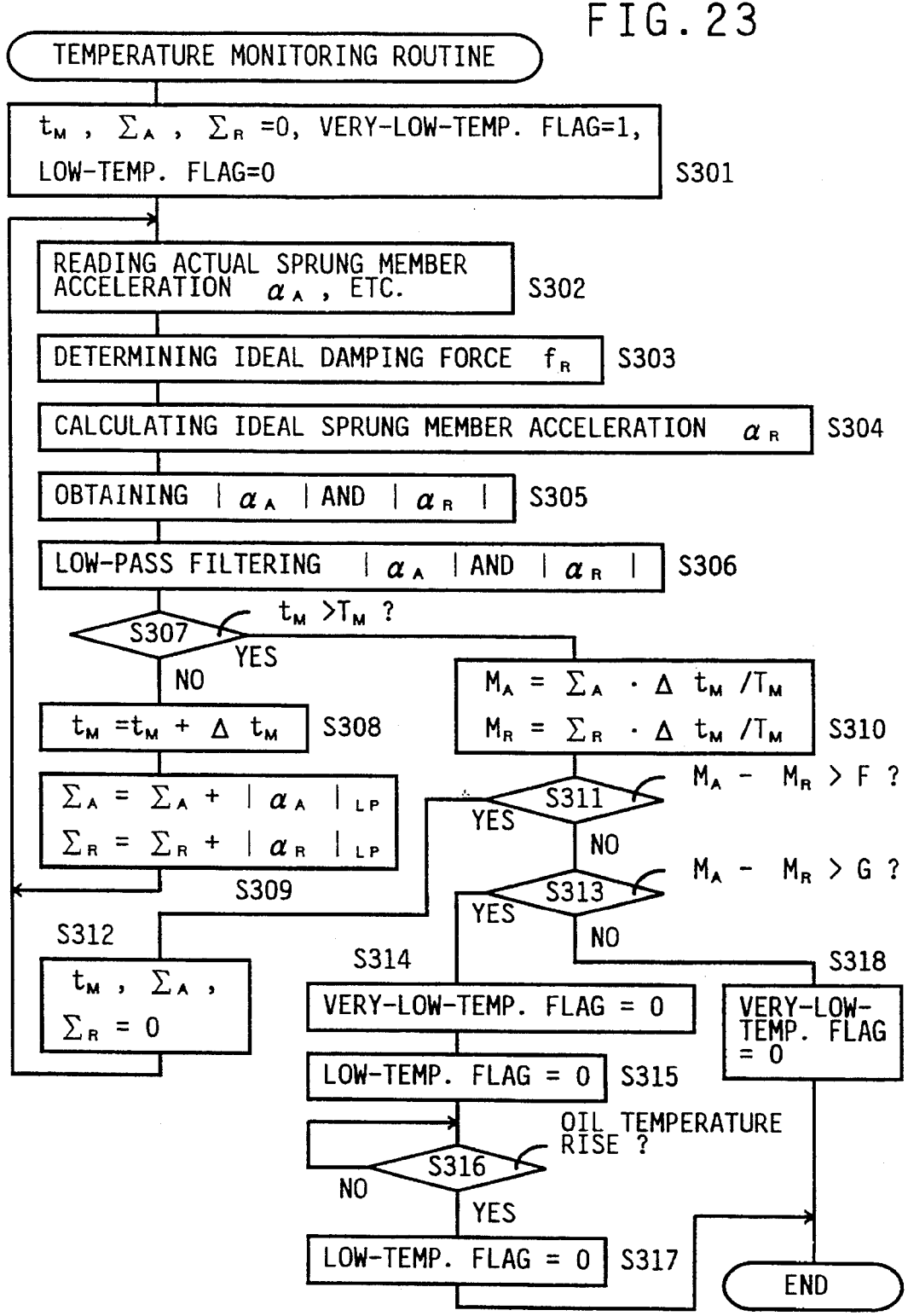
FIG. 23 is a flow chart illustrating a temperature monitoring routine used in an eighth embodiment of the present invention.

In the present eighth embodiment, too, the acceleration sensor 80 serves as means for detecting the acceleration of the sprung member, while the displacement sensor 82 serves as means for detecting the relative displacement of the sprung and unsprung members, and that a portion of the controller 60 assigned to execute the TEMPERATURE MONITORING routine of FIG. 23 constitutes means for estimating the oil temperature of the shock absorber. Further, a portion of the controller 60 assigned to implement steps S402, S404 and S405 of the flow chart of FIG. 24 constitutes means for placing the motor 40 in a predetermined position upon estimation or determination of the oil temperature of the shock absorber. It is also noted that the controller 60 serves as a controller for controlling the motor 40 to regulate the damping characteristic of the shock absorber.

In the eighth embodiment, the drive signal applied to the actuator (stepping motor 40) to control the damping characteristic of the shock absorber is determined irrespective of whether the oil temperature is in the low range or in the high range, so that the flow resistance of the oil within the shock absorber (which is determined by the effective cross sectional area of flow of the passage 26) is controlled depending upon the vibrating condition of the vehicle (which is represented by the relative speed $v_S$ and relative displacement $\delta_S$ of the sprung and unsprung members, and acceleration $\alpha$ or speed of the sprung member). However, the viscosity of the oil and the actual damping characteristic of the shock absorber vary depending upon whether the oil temperature is in the low range or high range. For improved accuracy of control of the damping characteristic, it is desirable to determine the motor drive signal, namely, the amount of operation of the actuator (which determines the flow resistance of the oil or cross sectional area of flow of the oil passage 26) depending upon not only the detected vibrating condition of the vehicle but also the estimated oil temperature, so that the flow resistance of the oil in the shock absorber is reduced as the oil temperature is lowered, more specifically, so that the cross sectional area of flow of the oil passage is increased with a decrease in the oil temperature. This arrangement assures ideal damping characteristic of the shock absorber irrespective of the varying oil temperature.

Thus, it is desirable to determine the relationship between the detected vibration condition of the vehicle and the operating amount of the stepping motor 40, depending upon the estimated oil temperature within the shock absorber. For example, the relationship may be determined so that the flow resistance of the oil is smaller over the entire range of the vehicle vibration condition, when the oil temperature is in the low range, than it is in the high range. In this case, the relationship may be determined by a control gain used in the equation of vibration of a sky hook damper. Alternatively, the relationship may be determined so that the operating amount of the motor increases with the magnitude of the vehicle vibration when the vibration magnitude is smaller than a critical level, and is held constant irrespective of the vibration magnitude when the vibration magnitude is larger than the critical level, such that the critical level is lower when the oil temperature is in the low range than in the high range.

There will next be described a ninth embodiment of this invention, which uses a TEMPERATURE MONITORING routine as illustrated in the flow chart of FIG. 25, and the DAMPING FORCE CONTROL routine of FIG. 6.

The TEMPERATURE MONITORING routines used in all of the preceding embodiments to monitor the oil temperature employ the ideal sprung member acceleration $\alpha_A$ calculated based on the detected relative displacement $\delta_S$. However, the use of the relative displacement $\delta_S$ is not essential to monitor the oil temperature. The present ninth embodiment is adapted to effect simplified monitoring of the oil temperature without using the detected relative displacement $\delta_S$.

Figure 25:
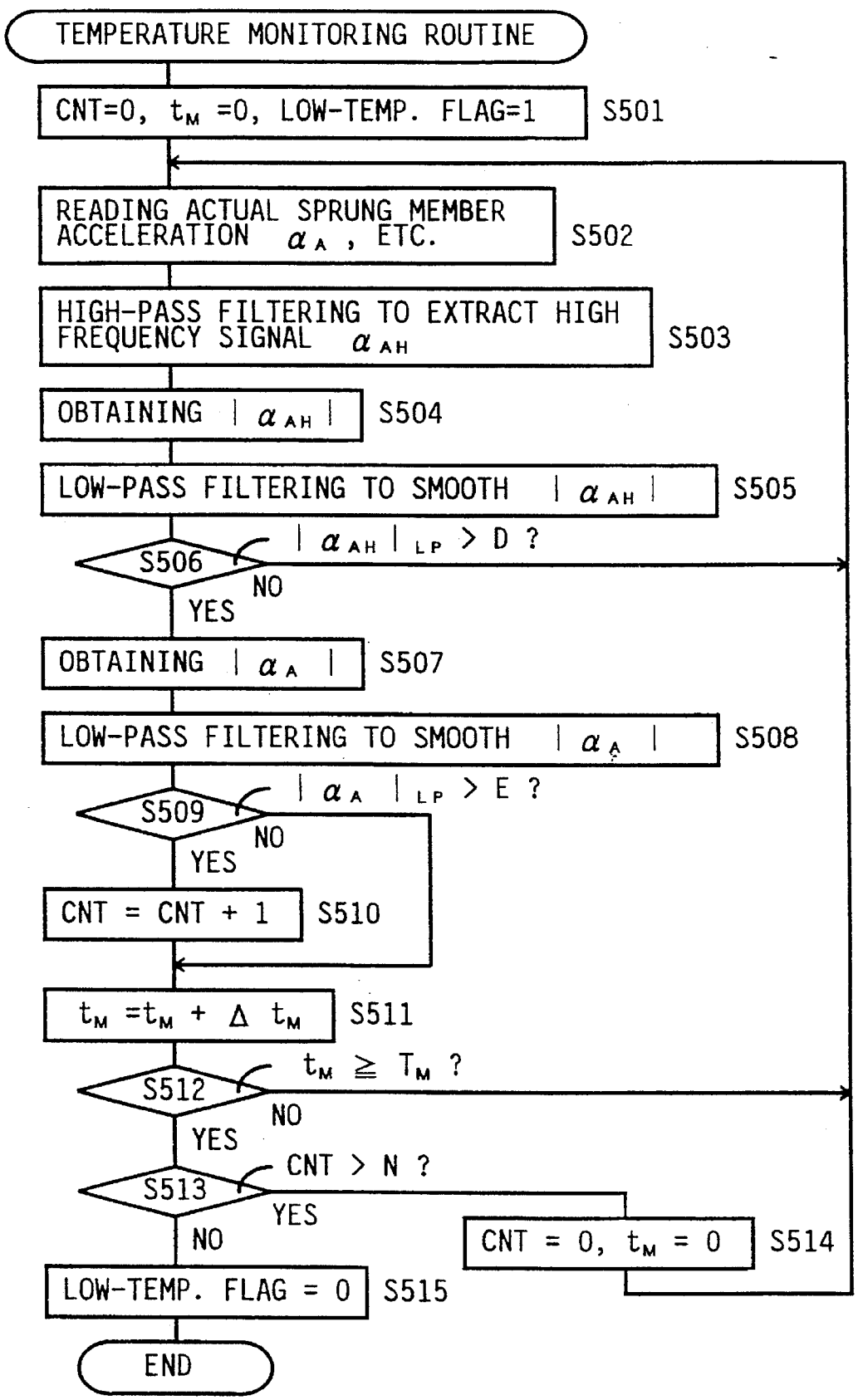
FIG. 25 is a flow chart illustrating a temperature monitoring routine used in a ninth embodiment of the invention.
Figure 26:
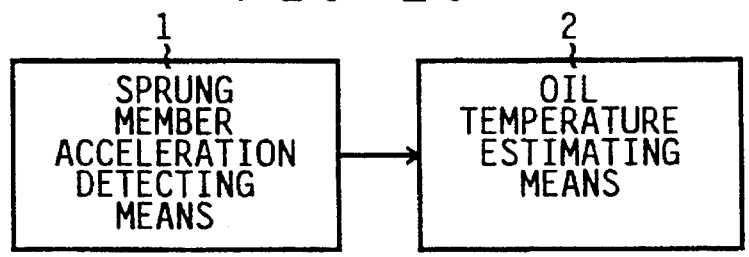
Figure 27:
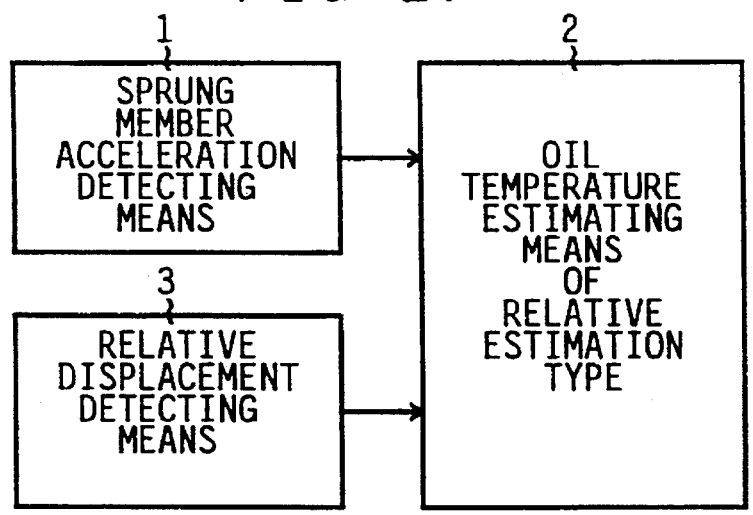
Figure 28:
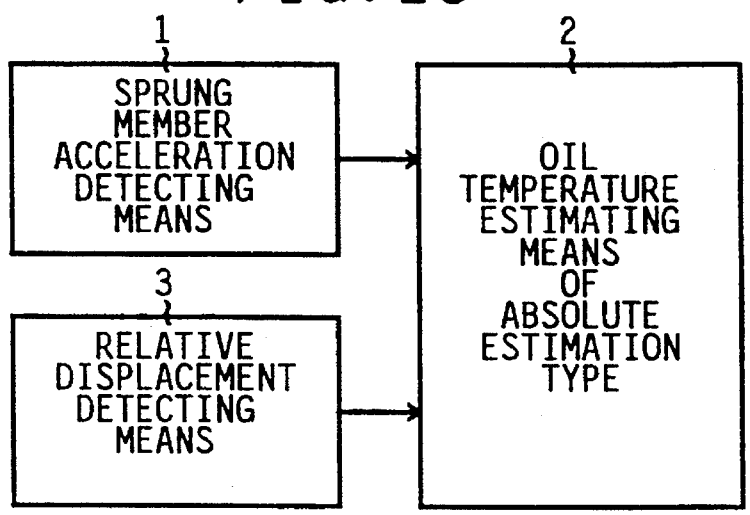
Figure 29:
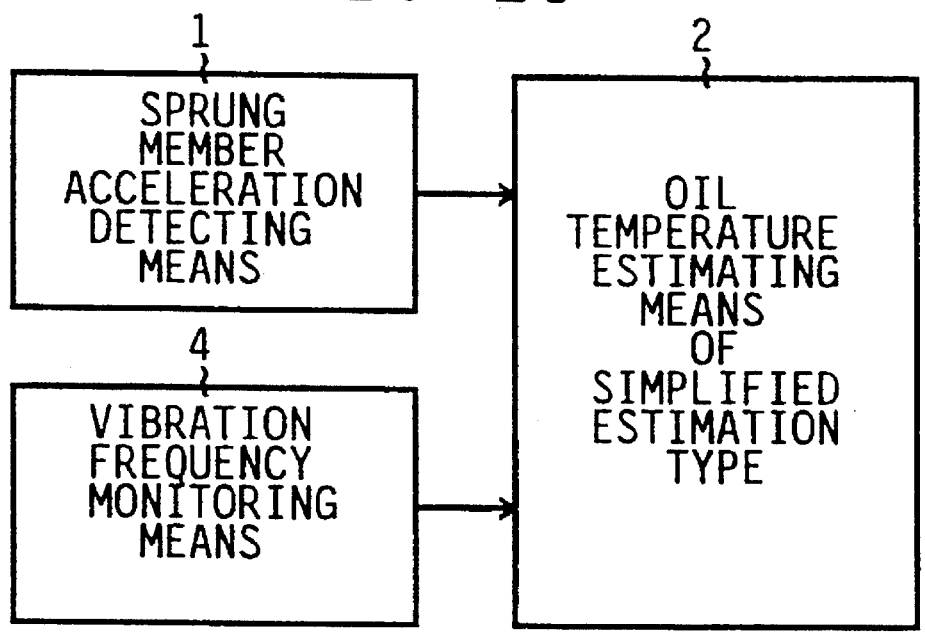
Figure 30:
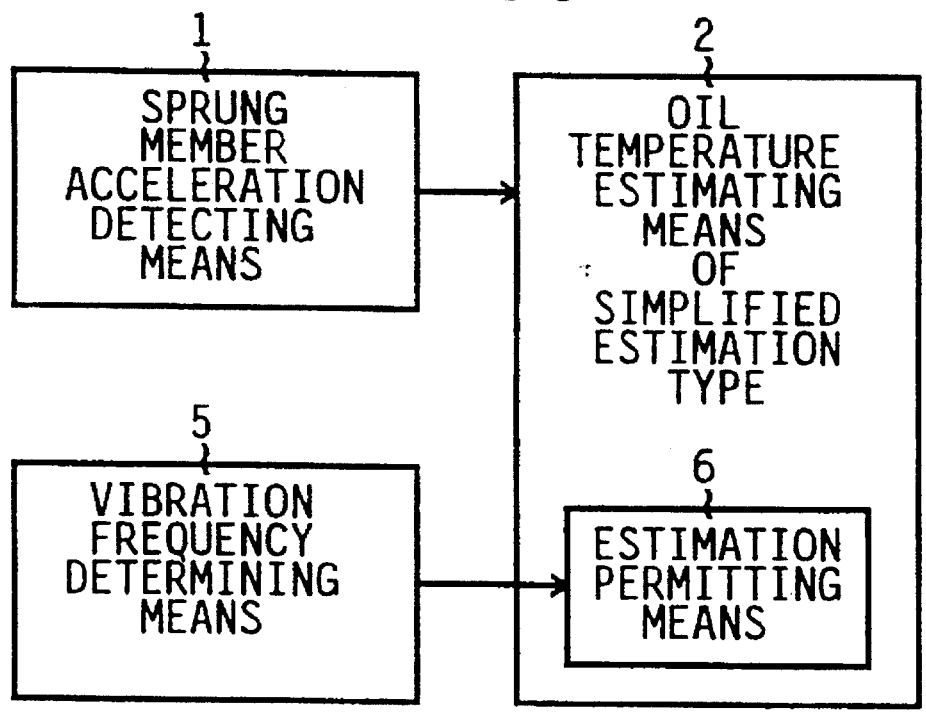
Figure 33:
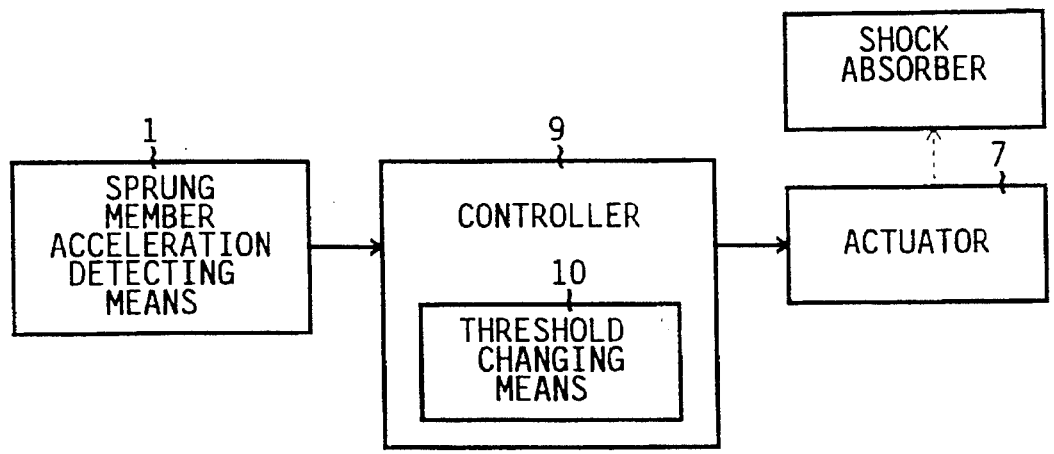
Figure 34:
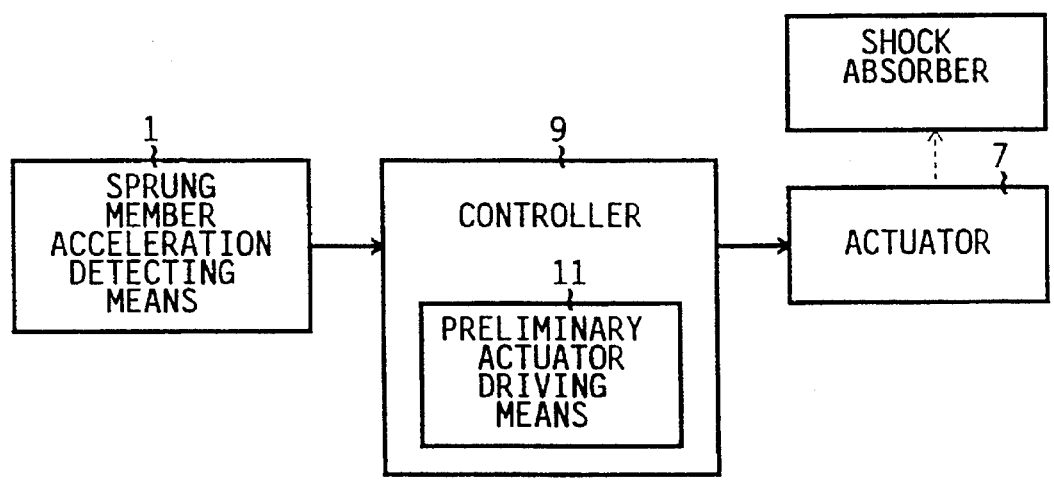
Figure 35:
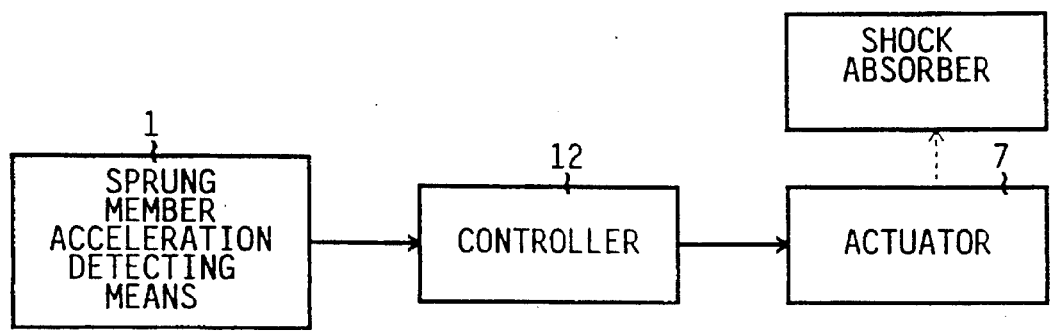

The principle of the TEMPERATURE MONITORING routine of FIG. 25 will be first explained.

While the cross sectional area of flow of the oil in the shock absorber remains constant, the actual damping force $f_A$ of the shock absorber is larger when the oil temperature is low than it is high. However, the relationship between the actual damping force $f_A$ and the actual acceleration $\alpha_A$ of the sprung member is not constant. For instance, the actual acceleration $\alpha_A$ decreases with an increase of the actual damping force $f_A$ when the frequency of the vibration of the sprung member is lower than about 2 Hz, but the actual acceleration $\alpha_A$ increases with an increase of the actual damping force $f_A$ when the vibration frequency is higher than about 2 Hz. In other words, while the vibration frequency is lower than about 2 Hz, the actual damping force $f_A$ increases with a decrease of the oil temperature, and the actual acceleration $\alpha_A$ decreases with an increase in the actual damping force $f_A$. While the vibration frequency is higher than about 2 Hz, the actual damping force $f_A$ increases with a decrease of the oil temperature, and the actual acceleration $\alpha_A$ increases with an increase in the actual damping force $f_A$. In the present embodiment, therefore, the oil temperature is determined to be in the low range when the vibration frequency is higher than 2 Hz, and when the actual acceleration $\alpha_A$ of the sprung member is higher than a threshold value.

The TEMPERATURE MONITORING routine will be described in detail by reference to the flow chart of FIG. 25.

The routine is initiated with Step S501 to reset the count of the counter CNT and the time $t_M$ to "0", and set the LOW-TEMP. flag to "1". Then, steps S502 through S506 are implemented to determine, based on the actual acceleration $\alpha_A$ of the sprung member, whether the frequency of the vibration of the sprung member received from the road surface is higher than 2 Hz.

Step S502 is implemented to read the detected actual sprung member acceleration $\alpha_A$, Step S503 is then implemented to high-pass filter the acceleration $\alpha_A$ to thereby extract a high-frequency signal $\alpha_{AH}$ indicative of a change of the actual acceleration $\alpha_A$. Step S503 is followed by step S504 to obtain the absolute value $|\alpha_{AH}|$, and step S505 to low-pass filter the absolute value $|\alpha_{AH}|$ to obtain a smoothed value $|\alpha_{AH}|_{LP}$. The control flow then goes to step S506 to determine whether the smoothed value $|\alpha_{AH}|_{LP}$ is larger than a threshold "D", that is to determine whether the vibration frequency of the vehicle is relatively high (higher than 2 Hz), with the intensity of the high-frequency signal $\alpha_{AH}$ being relatively high. If a negative decision (NO) is obtained in Step S506, the control flow returns to step S502, and the following steps to effect determination of the oil temperature will not be implemented.

If an affirmative decision (YES) is obtained in step S506, steps S507–S515 will be implemented to determine whether there is a high tendency of the absolute value of the actual acceleration $\alpha_A$ being higher than a threshold "E" when the stepping motor 40 is located at its zero point and when the vibration frequency of the vehicle is high. The threshold "E" is determined such that the absolute value of the actual acceleration $\alpha_A$ cannot exceed the threshold "E" when the oil temperature is in the high range.

Described more specifically, step S507 is implemented to obtain the absolute value $|\alpha_A|$ of the actual acceleration $\alpha_A$, and step S508 is then implemented to low-pass filter the absolute value $|\alpha_A|$ to obtain a smoothed value $|\alpha_A|_{LP}$. step S508 is followed by step S509 to determine whether the smoothed value $|\alpha_A|_{LP}$ is larger than the threshold "E". If an affirmative decision (YES) is obtained in step S509, step S510 is implemented to increment the count of the counter CNT. If a negative decision (NO) is obtained in step S509, the control flow goes to step S511 to increment the time $t_M$ by a predetermined increment $\Delta t_M$. Then, step S512 is implemented to determine whether the time $t_M$ is equal to or longer than a threshold $T_M$. If a negative decision (NO) is obtained in step S512, the control returns to step S502.

If the time $t_M$ exceeds the threshold $T_M$ during repeated implementation of steps S502–S512, the control flow goes to step S513 to determine whether the present count of the counter CNT exceeds the threshold "N". If an affirmative decision (YES) is obtained in step S513, step S514 is implemented to reset the count of the counter CNT and the time $t_M$ to "0". In this case, the LOW-TEMP. flag remains "1", and the control returns to step S502 to continue the monitoring of the oil temperature. If the count of the counter CNT upon expiration of the sampling time $T_M$ is not larger than "N", a negative decision (NO) is obtained in step S515 to reset the LOW-TEMP. flag to "0", to indicate that the oil temperature is in the high range. In this case, the routine is terminated, and will not be executed until the ignition switch of the vehicle is turned off and is again turned on.

In the present ninth embodiment, the acceleration sensor 80 is used to determine the vibration frequency of the vehicle, and an exclusive sensor for this purpose is not necessary, whereby the cost of the apparatus is accordingly lowered.

In the present ninth embodiment, too, the acceleration sensor 80 serves as means for detecting the acceleration of the sprung member, while a portion of the controller 60 assigned to execute the TEMPERATURE MONITORING routine of FIG. 25 constitutes means for estimating the oil temperature of the shock absorber. Further, a portion of the controller 60 assigned to implement steps S43, S44 and S46 of the flow chart of FIG. 5 constitutes means for placing the motor 40 in a predetermined position upon estimation or determination of the oil temperature of the shock absorber. It is also noted that a portion of the controller 60 assigned to implement steps S502–S506 constitutes means for monitoring the vehicle vibration frequency, and that the controller 60 serves as a controller for controlling the motor 40 to regulate the damping characteristic of the shock absorber.

While the present invention has been described in detail in its presently preferred embodiments, it is to be understood that the invention is not limited to the details of the illustrated embodiments, but may be otherwise embodied.

In the preceding embodiments, the actuator in the form of the stepping motor 40 is a wet type accommodated with the rod 22 of the shock absorber. However, the actuator may be a dry type disposed outside the rod of the shock absorber. In this case, the actuator is connected through a control rod to a suitable mechanism f or controlling the damping force of the shock absorber. In the dry type actuator, too, the lcad acting on the actuator is relatively high during an initial period of operation of the shock absorber, due to insufficient run-in of the sliding surfaces within the shock absorber, for example, as in the wet type actuator. The dry type actuator wherein sealing members (such as O-rings) are disposed between the control rod and the rod 22 also suffers from an increase in the load due to a high tendency of sticking of the sealing members to the sliding surfaces.

It is to be understood that the present invention may be embodied with various other changes, modifications and improvements, which may occur to those skilled in the art, without departing from the spirit and scope of the invention defined in the following claims.

What is claimed is:

1. A device for estimating a temperature of a working oil in a shock absorber in a suspension system which connects a sprung member and an unsprung member of a motor vehicle, comprising:

acceleration detecting means for detecting an actual value of vertical acceleration of said sprung member; and temperature estimating means for estimating the temperature of said working oil in said shock absorber using said actual value of vertical acceleration of said sprung member detected by said acceleration detecting means.

2. A device according to claim 1, further comprising displacement detecting means for detecting a relative displacement of said sprung and unsprung members in a vertical direction of the motor vehicle, and wherein said temperature estimating means comprises:

storing means for storing a predetermined relationship between a damping force of said shock absorber and a relative speed of said sprung and unsprung members, the predetermined relationship between the damping force and the relative speed occurring when the temperature of the working oil is at a reference level, said relative speed being a rate of change of said relative displacement;

means, responsive to said storing means, for detecting said relative speed on the basis of said relative displacement detected by said displacement detecting means;

means for determining a reference damping force on the basis of the detected relative speed and according to said predetermined relationship stored in the storing means, said reference damping force being the damping force of said shock absorber which corresponds to said detected relative displacement;

means for determining a reference value of vertical acceleration of said sprung member which is expected to occur under the determined reference damping force and said detected relative displacement; and means for estimating the temperature of the working oil using said detected actual value of vertical acceleration of said sprung member detected by the acceleration detecting means and said determined reference value of vertical acceleration of said sprung member.

3. A device according to claim 1, further comprising displacement detecting means for detecting a relative displacement of said sprung and unsprung members in a vertical direction of the motor vehicle, and wherein said temperature estimating means comprises:

means for detecting a relative speed of said sprung and unsprung members on the basis of said relative displacement detected by said displacement detecting means;

means for estimating an actual value of a damping force of said shock absorber, using the detected relative displacement detected by the displacement detecting means and said detected actual value of vertical acceleration of said sprung member detected by the acceleration detecting means;

storing means for storing a predetermined relationship among the relative speed of said sprung and unsprung members, the damping force, and various values of the temperature of the working oil in the shock absorber; and means, responsive to said storing means, for estimating the temperature of the working oil using said detected relative speed and said estimated actual value of the damping force and according to said predetermined relationship stored in the storing means.

4. A device according to claim 1, further comprising vibration frequency monitoring means for determining whether a frequency of vibration of said motor vehicle during running thereof is in a predetermined one of a low range lower than a predetermined threshold and a high range higher than said predetermined threshold, and wherein:

said temperature estimating means operates while said vibration frequency monitoring means determines that said frequency of vibration of the motor vehicle is in said predetermined one of said low range and said high range, and the temperature estimating means estimates the temperature of the oil on the basis of a relationship between said actual value of vertical acceleration of said sprung member detected by said acceleration detecting means, and a reference value of vertical acceleration of said sprung member; and said reference value of vertical acceleration of the sprung member is expected to occur when the temperature of the working oil is at a predetermined reference level while the frequency of vibration of the motor vehicle is in said predetermined one of said low and high ranges.

5. A device according to claim 1, further comprising vibration frequency determining means for determining whether a frequency of vibration of said motor vehicle during running thereof is in a low range lower than a predetermined threshold, and wherein said temperature estimating means comprises estimation permitting means for permitting estimation of the temperature of the working oil in said shock absorber only while said vibration frequency determining means determines that said frequency of vibration of the motor vehicle is in said low range.

6. A device according to claim 1, wherein said temperature estimating means comprises means operable after the temperature of the working oil in the shock absorber is estimated to be lower than a predetermined level, for determining whether a condition that should have raised the temperature of the working oil above said predetermined level has been established, and determining that the temperature of the working oil is higher than said predetermined level after determining that said condition has been established.

7. A device according to claim 1, wherein said temperature estimating means comprises estimation resuming means operable when the temperature of the working oil in the shock absorber is estimated to be higher than a predetermined level, for terminating estimation of the temperature of the working oil using said actual value of vertical acceleration of said sprung member detected by said acceleration detecting means, determining whether a condition that should have lowered the temperature of the working oil below said predetermined level has been established, and resuming the estimation of the temperature of the working oil using said actual value of vertical acceleration after determining that said condition has been established.

8. A device according to claim 1, wherein a damping characteristic of said shock absorber is variable by an actuator, and said temperature estimating means comprises positioning means for placing said actuator in a predetermined position upon estimation of the temperature of the working oil in the shock absorber.

9. An apparatus for controlling a damping characteristic of a shock absorber in a suspension system which connects a sprung member and an unsprung member of a motor vehicle, comprising:

acceleration detecting means for detecting an actual value of vertical acceleration of said sprung member;

an actuator for controlling the damping characteristic of said shock absorber according to a drive signal applied thereto; and a controller for applying said drive signal to said actuator, to thereby operate said actuator for controlling said damping characteristic of said shock absorber, said controller comprising temperature estimating means for estimating a temperature of a working oil in said shock absorber using said actual value of vertical acceleration of said sprung member detected by said acceleration detecting means, said controller further comprising inhibiting means for inhibiting an operation of said actuator to control said damping characteristic of said shock absorber, when said temperature of said working oil estimated by said temperature estimating means is lower than a predetermined level.

10. An apparatus according to claim 9, wherein said temperature estimating means of said controller continues to estimate the temperature of the working oil and said inhibiting means continues to inhibit the operation of the actuator to control said damping characteristic as long as said temperature of the working oil estimated by said temperature estimating means is lower than said predetermined level, said controller permitting the operation of said actuator when the estimated temperature of the working oil is higher than said predetermined level.

11. An apparatus according to claim 10, wherein said temperature estimating means of said controller terminates estimation of the temperature of the working oil when said controller permits the operation of said actuator said controller further comprising estimation resuming means operable after the operation of said actuator is permitted, for determining whether a condition that should have lowered the temperature of the working oil above said predetermined level has been established, and resuming the estimation of the temperature of the working oil after determining that said condition has been established.

12. An apparatus according to claim 9, wherein said temperature estimating means of said controller terminates estimation of the temperature of the working oil and said inhibiting means inhibits the operation of the actuator when the temperature of the working oil is estimated to be lower than said predetermined level for the first time, said controller determining whether a condition that should have raised the temperature of the working oil above said predetermined level has been established, and permitting the operation of said actuator to control said damping characteristic of said shock absorber after determining that said condition has been established.

13. An apparatus according to claim 12, wherein said controller comprises parameter changing means operable on the basis of the temperature of the working oil estimated by said temperature estimating means, for changing a reference value used in determining whether said condition has been established.

14. An apparatus according to claim 9, wherein said controller applies drive pulses as said drive signal to said actuator at a nominal frequency to operate said actuator for controlling the damping characteristic of the shock absorber;

said controller comprising preliminary actuator driving means operable after the operation of said actuator is permitted, for applying drive pulses to said actuator at a frequency lower than said nominal frequency before said actuator is operated to control said damping characteristic.

15. An apparatus for controlling a damping characteristic of a shock absorber in a suspension system which connects a sprung member and an unsprung member of a motor vehicle, comprising:

acceleration detecting means for detecting an actual value of vertical acceleration of said sprung member;

an actuator for controlling the damping characteristic of said shock absorber according to drive pulses applied thereto; and a controller for applying said drive pulses to said actuator, to thereby operate said actuator for controlling said damping characteristic of said shock absorber, said controller comprising temperature estimating means for estimating a temperature of a working oil in said shock absorber using said actual value of vertical acceleration of said sprung member detected by said acceleration detecting means, said controller further comprising means for changing the frequency at which said drive pulses are applied to said actuator such that the frequency is lower when said working oil temperature estimated by said temperature estimating means is relatively low than when said working oil temperature estimated by said temperature estimating means is relatively high.

* * * * *

UNITED STATES PATENT AND TRADEMARK OFFICE
CERTIFICATE OF CORRECTION

PATENT NO. : 5,555,500  
DATED : September 10, 1996  
INVENTOR(S) : Kazuo OGAWA et al.

Page 1 of 5

It is certified that error appears in the above-indentified patent and that said Letters Patent is hereby corrected as shown below:

| Column | Line | |
|---|---|---|
| 1 | 53 | After "viscosity insert --being--. |
| 3 | 60 | After "temperature" delete "which". |
| 5 | 14 | Change "tendency" to --tendencies--. |
| 10 | 15 | After "absorber." insert --being--. |
| 12 | 42 | Change "point of time" to --point in time-- |
| 12 | 67 | Change "large" to --larger--. |
| 13 | 1 | After "operation" delete ",". |
| 15 | 50 | Change "part way" to --partway--. |
| 16 | 11 | After "52" insert --caused--. |
| 16 | 53 | Change "have" to --has--. |
| 17 | 4 | Change "fall in" to --fall into--. |
| 17 | 36 | After "acceleration" change "a" to --$\alpha$--. |

UNITED STATES PATENT AND TRADEMARK OFFICE
CERTIFICATE OF CORRECTION

PATENT NO. : 5,555,500
DATED : September 10, 1996
INVENTOR(S) : Kazuo OGAWA et al.

It is certified that error appears in the above-indentified patent and that said Letters Patent is hereby corrected as shown below:

| Column | Line | |
|---|---|---|
| 18 | 16 | Change "a" to --$\alpha$--. |
| 19 | 24 | After "and" change "$\|\alpha_A\|_{LP}$" to --$\|\alpha_R\|_{LP}$--. |
| 19 | 65 | Change "$\|\alpha_A$" to --$\|\alpha_A\|$--. |
| 20 | 8 | Change "...$\|\alpha_A\|$..." to --...$\|\alpha_R\|$...--. |
| 20 | 32 | After "$\alpha_R$" change "," to --.--. |
| 20 | 46 | Change "have" to --has--; change "influences" to --influence--. |
| 20 | 57 | Change "a largest" to --the largest--. |
| 21 | 3 | Change "fall in" to --fall into--. |
| 21 | 38 | Change "LOW-TEMP" to --LOW-TEMP.--. |
| 21 | 61 | Change "speed v" to --speed V--. |
| 23 | 9 | Change "flat" to --flag--. |

UNITED STATES PATENT AND TRADEMARK OFFICE
CERTIFICATE OF CORRECTION

PATENT NO. : 5,555,500
DATED : September 10, 1996
INVENTOR(S) : Kazuo OGAWA et al.

It is certified that error appears in the above-indentified patent and that said Letters Patent is hereby corrected as shown below:

| Column | Line | |
|---|---|---|
| 23 | 33 | Change "at "0" to --at "1"--. |
| 23 | 44 | After "signal" change "." to --,--. |
| 23 | 46 | After "$\alpha_A$" change "," to --.--. |
| 23 | 51 | Change "$|\alpha_{AL|LP}$" to --$|\alpha_{AL}|_{LP}$--. |
| 24 | 50 | Change "inhibit" to --inhibits--. |
| 25 | 17 | After "members" change "," to --;--; before "a portion" delete "that". |
| 27 | 4 | After "absorber" start new paragraph. |
| 27 | 34 | Change "TSO" to --$\mathbf{T_{SO}}$--. |
| 27 | 36 | Change "s134" to --S134--. |
| 27 | 49 | Before "a portion" delete "that". |
| 28 | 31 | Change "S11" to --S11--. |

UNITED STATES PATENT AND TRADEMARK OFFICE
CERTIFICATE OF CORRECTION

PATENT NO. : 5,555,500
DATED : September 10, 1996
INVENTOR(S) : Kazuo OGAWA et al.

It is certified that error appears in the above-indentified patent and that said Letters Patent is hereby corrected as shown below:

| Column | Line | |
|---|---|---|
| 28 | 57 | Before "a portion" delete "that". |
| 30 | 4 | Change "large" to --larger--. |
| 30 | 16 | Change "cheer" to --chamber--; change "cheers" to --chambers--. |
| 30 | 26 | Before "a portion" delete "that". |
| 30 | 41 | Change "embodiment" to --invention--. |
| 31 | 1 | After "respectively." start new paragraph. |
| 31 | 45 | Change "very-LOW-TEMP." to --VERY-LOW-TEMP.--. |
| 31 | 53 | Change "an negative" to --a negative--. |
| 31 | 58 | After "both" delete "of". |
| 32 | 9 | After "40" change "at" to --to--. |

UNITED STATES PATENT AND TRADEMARK OFFICE
CERTIFICATE OF CORRECTION

PATENT NO. : 5,555,500              Page 5 of 5
DATED     : September 10, 1996
INVENTOR(S) : Kazuo OGAWA et al.

It is certified that error appears in the above-indentified patent and that said Letters Patent is hereby corrected as shown below:

| Column | Line | |
|---|---|---|
| 32 | 12 | After "40" change "at" to --to--. |
| 32 | 29 | Change "iS" to --is--. |
| 32 | 40 | Before "a portion" delete "that". |
| 34 | 1  | Change "Step" to --step--. |
| 34 | 16 | After "that is" insert --,--. |
| 34 | 20 | Change "Step" to --step--. |
| 35 | 22 | Change "f or" to --for--. |
| 35 | 23 | Change "the lcad" to --the load--. |
| 38 | 4  | After "actuator" insert --,--. |

Signed and Sealed this

Twenty-fourth Day of December, 1996

BRUCE LEHMAN

Attest:

Attesting Officer      Commissioner of Patents and Trademarks